(12) United States Patent
Sato et al.

(10) Patent No.: US 7,864,264 B2
(45) Date of Patent: Jan. 4, 2011

(54) DISPLAY DEVICE

(75) Inventors: Tsutomu Sato, Mobara (JP); Masayuki Yanagihara, Mobara (JP); Koichi Fukuda, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 40 days.

(21) Appl. No.: 12/469,712

(22) Filed: May 21, 2009

(65) Prior Publication Data
US 2009/0231508 A1 Sep. 17, 2009

Related U.S. Application Data

(62) Division of application No. 11/688,929, filed on Mar. 21, 2007, now Pat. No. 7,542,105.

(30) Foreign Application Priority Data

Mar. 24, 2006 (JP) .............................. 2006-083242

(51) Int. Cl.
*G02F 1/1333* (2006.01)
(52) U.S. Cl. ....................................................... 349/60
(58) Field of Classification Search .............. 349/58–60
See application file for complete search history.

(56) References Cited

U.S. PATENT DOCUMENTS

| | | | |
|---|---|---|---|
| 5,793,461 A | 8/1998 | Inou | |
| 6,067,133 A | 5/2000 | Niibori | |
| 6,597,414 B1 | 7/2003 | Hasegawa | |
| 7,692,732 B2 * | 4/2010 | Tsubokura et al. | ............ 349/58 |
| 2007/0165170 A1* | 7/2007 | Fukuda | ........................ 349/138 |

FOREIGN PATENT DOCUMENTS

| | | |
|---|---|---|
| JP | 08-006039 | 1/1996 |
| JP | 08-110521 | 4/1996 |

* cited by examiner

*Primary Examiner*—Mark A Robinson
*Assistant Examiner*—Michael Inadomi
(74) *Attorney, Agent, or Firm*—Antonelli, Terry, Stout & Kraus, LLP.

(57) ABSTRACT

A display device includes a display panel having opposed first and second substrates with the second substrate being arranged closer to a viewer, an upper polarizer which is arranged closer to the viewer than the second substrate, and a resin film which is arranged closer to the viewer than the upper polarizer and is in contact with the upper polarizer. An outer periphery of the upper polarizer is arranged inside an outer periphery of the second substrate, and an outer periphery of the resin film is arranged outside the outer periphery of the upper polarizer as viewed from a front surface of the display panel. A cushion material is in contact with the second substrate, and the resin film is interposed between the second substrate and the resin film.

12 Claims, 15 Drawing Sheets

DISPLAY DEVICE

CROSS REFERENCE TO RELATED APPLICATION

This is a division of U.S. application Ser. No. 11/688,929, filed Mar. 21, 2007 now U.S. Pat. No. 7,542,105 the contents of which are incorporated herein by reference.

The present application claims priority from Japanese application JP2006-083242 filed on Mar. 24, 2006, the content of which is hereby incorporated by reference into this application.

BACKGROUND OF THE INVENTION

1. Field of the Invention

The present invention relates to a display device, and more particularly to a technique which is effectively applicable to a liquid crystal display device (liquid crystal display module) used in a portable electronic device such as a mobile phone terminal.

2. Description of Related Art

Conventionally, as a display of a portable electronic device such as a mobile phone terminal or a PDA (Personal Digital Assistant), for example, a thin display device such as a liquid crystal display device is used. Here, the display device used in the portable electronic device is also referred to as a display module.

The liquid crystal display device is a display device which includes a liquid crystal display panel sandwiching a liquid crystal material between a pair of substrates. Here, one of the pair of substrates is generally referred to as a TFT substrate and such a TFT substrate is constituted by forming TFT (Thin Film Transistor) elements, pixel electrodes and the like on a glass substrates for example. Further, another of the pair of substrates is generally referred to as a counter substrate and such a counter substrate is constituted by forming color filters and the like on a glass substrate, for example. Here, when the liquid crystal display panel adopts a vertical electric field method as a method for driving the liquid crystal material, common electrodes which face the pixel electrodes in an opposed manner are formed on the counter substrate side. On the other hand, when the liquid crystal display panel adopts a lateral electric field method as the method for driving the liquid crystal material, the common electrodes are formed on the TFT substrate side.

Recently, efforts for making a body of the portable electronic device thin have been made and along with such efforts, efforts for making the liquid crystal display device which is used in the portable electronic device thin have been also made. As a method of making the liquid crystal display device thin, for example, a method which makes the liquid crystal display panel thin has been known.

As the method which makes the liquid crystal display panel thin, for example, a method which makes the glass substrate used as the TFT substrate or the counter substrate thin by grinding has been known.

Further, as the method which makes the liquid crystal display panel thin, for example, a method which uses a plastic substrate in place of the glass substrate as either one of the TFT substrate or the counter substrate has been also known (see JP-A-8-006039, for example).

SUMMARY OF THE INVENTION

In the above-mentioned liquid crystal display device, when the glass substrate which is used as the TFT substrate or the counter substrate is made thin by grinding for making the liquid crystal display panel thin, along with such reduction of thickness of the substrate by grinding, a strength of the glass substrate is lowered thus lowering a strength of the liquid crystal display panel. Accordingly, the method which makes the glass substrate thin by grinding has a drawback that it is difficult to realize both the reduction of thickness of the substrate and the acquisition of the sufficient strength simultaneously.

Further, in the method which uses the plastic substrate in place of the glass substrate, the heat resistance and the solvent resistance (chemical resistance) of the plastic substrate is weaker than the heat resistance and the solvent resistance of the glass substrate and hence, there arises a drawback that handling of the parts in forming the TFT elements and the like on the glass substrate becomes difficult, for example. Further, for example, in the liquid crystal display panel which uses the TFT substrate formed of the glass substrate and the counter substrate formed of the plastic substrate, the respective substrates exhibit deformation quantities different from each other attributed to changes of an environment such as temperature and moisture thus giving rise to a drawback that display irregularities are liable to easily occur.

That is, the conventional liquid crystal display device, due to the above-mentioned reasons, has a drawback that the further reduction of the thickness of the liquid crystal display panel is difficult. Accordingly, there also exists a drawback that the further reduction of the thickness of a portable electronic equipment which uses the conventional liquid crystal display device, for example, is difficult.

It is an advantage of the present invention to provide a technique which can realize both the reduction of a thickness of a liquid crystal display panel and the acquisition of a sufficient strength of the liquid crystal display panel simultaneously.

It is another advantage of the present invention to provide a technique which can realize the reduction of a thickness of a portable electronic device having a liquid crystal display device (liquid crystal display module), for example.

The above-mentioned other advantages and novel features of the present invention will become apparent from the description of this specification and attached drawings.

To explain typical inventions among the inventions described in this specification, they are as follows.

(1) It is a first aspect of the present invention to provide a display device having a display panel which includes a first substrate, a second substrate which is arranged to face the first substrate in an opposed manner on a side closer to a viewer than the first substrate, an upper polarizer which is arranged on the side closer to the viewer than the second substrate, and a resin film which is arranged on the side closer to the viewer than the upper polarizer and is brought into close contact with the upper polarizer by adhesion, wherein an outer periphery of the upper polarizer is arranged more inside than an outer periphery of the second substrate and an outer periphery of the resin film is arranged more outside than the outer periphery of the upper polarizer as viewed from a front surface of the display panel, and a cushion material which is brought into close contact with the second substrate and the resin film is interposed between the second substrate and the resin film more outside than the outer periphery of the upper polarizer.

(2) In the display device having the above-mentioned constitution (1), the cushion material is formed in an annular shape to surround the outer periphery of the upper polarizer.

(3) In the display device having the above-mentioned constitution (1) or (2), the display panel is housed in a box-like or a frame-like support member, and the cushion material is brought into close contact with a side of an inner surface of the support member.

(4) In the display device having the above-mentioned any one of constitutions (1) to (3), the resin film has a thickness of 0.2 mm or more and 2 mm or less.

(5) In the display device having the above-mentioned any one of constitutions (1) to (4), a material of the resin film is an acrylic resin or an epoxy resin.

(6) In the display device having the above-mentioned any one of constitutions (1) to (5), a surface hardness of the resin film is a surface pencil hardness of 3H or more.

(7) In the display device having the above-mentioned any one of constitutions (1) to (6), a total thickness of the display panel excluding the resin film is 1.4 mm or less.

(8) In the display device having the above-mentioned any one of constitutions (1) to (7), the display panel includes an upper retardation plate between the upper polarizer and the second substrate.

(9) In the display device having the above-mentioned any one of constitutions (1) to (8), the display panel includes a lower polarizer which is arranged behind the first substrate as viewed from the viewer.

(10) In the display device having the above-mentioned constitution (9), the display panel includes a lower retardation plate between the lower polarizer and the first substrate.

(11) In the display device having the above-mentioned any one of constitutions (1) to (10), the first substrate and the second substrate are glass substrates.

(12) In the display device having the above-mentioned any one of constitutions (1) to (11), the display panel includes a liquid crystal layer between the first substrate and the second substrate.

(13) It is a second aspect of the present invention to provide a display device having a display panel which includes a first substrate, a second substrate which is arranged to face the first substrate in an opposed manner on a side closer to a viewer than the first substrate, an upper polarizer which is arranged on the side closer to the viewer than the second substrate, and a resin film which is arranged on the side closer to the viewer than the upper polarizer and is brought into close contact with the upper polarizer by adhesion, a box-like or a frame-like support member which houses the display panel, and a frame member which is arranged outside the support member, wherein an outer periphery of the upper polarizer is arranged more inside than an outer periphery of the second substrate and an outer periphery of the resin film is arranged more outside than the outer periphery of the upper polarizer as viewed from a front surface of the display panel, the frame member is arranged between the second substrate and the resin film as viewed from the viewer and includes a portion which is overlapped to the second substrate and the resin film as viewed from a front surface of the display panel, a first cushion material which is respectively brought into close contact with the second substrate and the frame member is interposed between the second substrate and the portion of the frame member which is overlapped to the second substrate, and a second cushion material which is respectively brought into close contact with the resin film and the frame member is interposed between the resin film and the portion of the frame member which is overlapped to the resin film.

(14) In the display device having the above-mentioned constitution (13), the first cushion material and the second cushion material are formed in an annular shape to surround the outer periphery of the upper polarizer.

(15) In the display device having the above-mentioned constitution (13) or (14), the resin film has a thickness of 0.2 mm or more and 2 mm or less.

(16) In the display device having the above-mentioned any one of constitutions (13) to (15), a material of the resin film is an acrylic resin or an epoxy resin.

(17) In the display device having the above-mentioned any one of constitutions (13) to (16), a surface hardness of the resin film is a surface pencil hardness of 3H or more.

(18) In the display device having the above-mentioned any one of constitutions (13) to (17), a total thickness of the display panel excluding the resin film is 1.4 mm or less.

(19) In the display device having the above-mentioned any one of constitutions (13) to (18), the display panel includes a conductive layer between the upper polarizer and the resin film.

(20) In the display device having the above-mentioned any one of constitutions (13) to (19), the display panel includes an upper retardation plate between the upper polarizer and the second substrate.

(21) In the display device having the above-mentioned any one of constitutions (13) to (20), the display panel includes a lower polarizer which is arranged behind the first substrate as viewed from the viewer.

(22) In the display device having the above-mentioned constitution (21), the display panel includes a lower retardation plate between the lower polarizer and the first substrate.

(23) In the display device having the above-mentioned any one of constitutions (13) to (22), the first substrate and the second substrate are glass substrates.

(24) In the display device having the above-mentioned any one of constitutions (13) to (23), the display panel includes a liquid crystal layer between the first substrate and the second substrate.

(25) It is a third aspect of the present invention to provide a display device having a display panel which includes a first substrate, a second substrate which is arranged to face the first substrate in an opposed manner on a side closer to a viewer than the first substrate, an upper polarizer which is arranged on the side closer to the viewer than the second substrate, and a resin film which is arranged on the side closer to the viewer than the upper polarizer and is brought into close contact with the upper polarizer by adhesion, a box-like or a frame-like support member which houses the display panel, and a frame member which is arranged outside the support member, wherein an outer periphery of the upper polarizer is arranged more inside than an outer periphery of the second substrate and an outer periphery of the resin film is arranged more inside than the outer periphery of the upper polarizer as viewed from a front surface of the display panel, the frame member is arranged in front of the upper polarizer as viewed from the viewer and includes a portion which is overlapped to the upper polarizer and a portion which is overlapped to the second substrate outside the outer periphery of the upper polarizer as viewed from the front surface of the display panel, and a cushion material which is brought into close contact with the upper polarizer and the frame member in a region more inside than the outer periphery of the upper polarizer and is brought into close contact with the second substrate and the frame member in a region more outside than the outer periphery of the upper polarizer is interposed between the upper polarizer and the portion of the frame member which is overlapped to the upper polarizer and the second substrate and the portion of the frame member which is overlapped to the second substrate.

(26) In the display device having the above-mentioned constitution (25), the cushion material is formed in an annular shape to surround the outer periphery of the upper polarizer.

(27) In the display device having the above-mentioned constitution (25) or (26), the resin film has a thickness of 0.2 mm or more and 2 mm or less.

(28) In the display device having the above-mentioned any one of constitutions (25) to (27), a material of the resin film is an acrylic resin or an epoxy resin.

(29) In the display device having the above-mentioned any one of constitutions (25) to (28), a surface hardness of the resin film is a surface pencil hardness of 3H or more.

(30) In the display device having the above-mentioned any one of constitutions (25) to (29), a total thickness of the display panel excluding the resin film is 1.4 mm or less.

(31) In the display device having the above-mentioned any one of constitutions (25) to (30), the display panel includes an upper retardation plate between the upper polarizer and the second substrate.

(32) In the display device having the above-mentioned any one of constitutions (25) to (31), the display panel includes a lower polarizer which is arranged behind the first substrate as viewed from the viewer.

(33) In the display device having the above-mentioned constitution (32), the display panel includes a lower retardation plate between the lower polarizer and the first substrate.

(34) In the display device having the above-mentioned any one of constitutions (25) to (33), the first substrate and the second substrate are glass substrates.

(35) In the display device having the above-mentioned any one of constitutions (25) to (34), the display panel includes a liquid crystal layer between the first substrate and the second substrate.

One technical feature of the display device of the present invention lies in that the resin film is arranged on the side closer to the viewer than the upper polarizer of the display panel, and the resin film is brought into close contact with the upper polarizer by adhesion. In the display panel which includes such a resin film, the resin film possesses a function as a reinforcing member thus enhancing a strength of the display panel. Accordingly, even when the first substrate, the second substrate or both of the first substrate and the second substrate are made thin, it is possible to ensure the sufficient strength of the liquid crystal display panel. Accordingly, it is possible to realize both the further reduction of the thickness of the display panel and the acquisition of the sufficient strength of the display panel simultaneously.

Further, in the display device of the present invention, for example, the outer periphery of the upper polarizer is arranged more inside than the outer periphery of the second substrate and the outer periphery of the resin film is arranged more outside than the outer periphery of the upper polarizer as viewed from the front surface of the display panel. Here, the cushion material which is brought into close contact with the second substrate and the resin film is interposed between the second substrate and the resin film more outside than the outer periphery of the upper polarizer. Further, the cushion material may preferably be formed in an annular shape to surround the outer periphery of the upper polarizer. Due to such a constitution, the outer periphery of the upper polarizer is brought into a state in which the outer periphery of the upper polarizer is sealed by the second substrate, the resin film and the cushion material. Accordingly, it is possible to prevent the outer peripheral portion of the upper polarizer from being deteriorated with moisture or the like which intrudes the inside of the display device from the outside of the display device, for example.

Further, in the display device of the present invention, the display panel is, in general, housed in a resin-made support member which is formed in a box shape or a frame shape, for example. Here, the cushion material may preferably be brought into close contact with the inner surface of the support member. A flexible printed circuit board is connected to the display panel, for example, and semiconductor chips are mounted on the display panel and the flexible printed circuit board. Due to such a constitution, when the cushion material is brought into close contact with the inner surface of the support member, it is possible to prevent the further intrusion of moisture or the like which intrudes the inside of the display device from the outside of the display device using the cushion material.

Further, in the display device of the present invention, the metal-made frame member may be arranged outside the support member, for example. In this case, for example, a portion which is positioned between the second substrate and the resin film as viewed from the viewer and is overlapped to the second substrate and the resin film may be provided to the frame member. Further, the first cushion material which is brought into close contact with the second substrate and the frame member respectively may be interposed between the second substrate and the region of the frame member which is overlapped to the second substrate, and the second cushion material which is brought into close contact with the resin film and the frame member respectively may be interposed between the resin film and the region of the frame member which is overlapped to the resin film. Due to such a constitution, it is possible to prevent the further intrusion of moisture or the like which intrudes the inside of the display device from the outside of the display device using the first cushion material and the second cushion material.

Here, the frame member may be formed into a box-shape having a bottom surface between the second substrate and the resin film as viewed from the viewer, and an opening portion may be formed in the bottom surface of the frame member. Here, the opening portion formed in the bottom surface of the frame member has an outer periphery thereof arranged more outside than the outer periphery of the upper polarizer and more inside than the outer peripheries of the second substrate and the resin film.

Further, in the display device having such a constitution, for example, the conductive layer may be formed on the surface of the resin film which faces the upper polarizer in an opposed manner. Here, by using the cushion material having conductivity as the second cushion material, for example, and by bringing the resin film and the second cushion material into close contact with each other by interposing the conductive layer there between, it is possible to prevent the charging of the resin film or the upper polarizer.

Further, in the display device in which the frame member is arranged outside the support member which houses the display panels the outer periphery of the upper polarizer may be arranged more inside than the outer periphery of the second substrate and the outer periphery of the resin film may be arranged more inside than the outer periphery of the upper polarizer. In this case, the frame member includes a portion which is arranged in front of the upper polarizer as viewed from the viewer and is overlapped to the upper polarizer as viewed from the front surface of the display panel, and a portion which is arranged outside the outer periphery of the upper polarizer and is overlapped to the second substrate. Further, a cushion material which is brought into close contact with the upper polarizer and the frame member in a region more inside than the outer periphery of the upper polarizer and is brought into close contact with the second substrate and the frame member in a region more outside than the outer periphery of the upper polarizer is interposed between the upper polarizer and the portion of the frame member which is overlapped to the upper polarizer and between the second substrate and the portion of the frame member which is overlapped to the second substrate. Due to such a constitution, an end surface (cut end surface) of the outer periphery of the upper polarizer is covered with the cushion material and hence, it is possible to prevent the outer peripheral portion of the upper polarizer from being deteriorated with moisture or the like which intrudes the inside of the display device from the outside of the display device, for example.

Further, in the display device of the present invention, the resin film may preferably have a thickness of 0.2 mm or more and 2 mm or less, for example. Further, the resin film may preferably be made of a material which exhibits high optical transmissivity, and more particularly, made of a color less transparent material. As such a material, for example, an acrylic resin or an epoxy resin can be named.

When the resin film is made of the acrylic resin or the epoxy resin, for example, a surface pencil hardness of the resin film becomes 3H or more. Here, the surface pencil hardness is a hardness which is expressed by a hardness which forms flaws on a surface of a material when a line is drawn on the surface of the material with a pencil. That is, the fact that the surface pencil hardness is 3H implies that no flaws are formed on the surface of the resin film when a line is drawn on the resin film with a pencil having a core of 3H or of hardness softer than 3H. In this manner, by setting the surface pencil hardness of the resin film to 3H or more, for example, when the display device of the present invention is incorporated in the mobile phone terminal, it is unnecessary to mount a protective cover which protects the display panel on a surface of an exterior (casing) of the mobile phone terminal. As a result, it is possible to make a display part of the mobile phone terminal thin.

Here, in the display device of the present invention, the material of the resin film may not be the acrylic resin or the epoxy resin and, at the same time, the surface pencil hardness of the resin film may not be 3H. That is, provided that the resin film allows the display panel to acquire a sufficient strength and is made of a material which exhibits high optical transmissivity, the resin film may be made of any material. Further, the surface pencil hardness may be increased by applying hard coating treatment to the surface of the resin film, for example.

Here, in the display device of the present invention, thicknesses of the first substrate and the second substrate of the display panel may preferably be set to 0.5 mm or less respectively. Here, the thickness of the first substrate and the thickness of the second substrate may be set substantially equal to each other or may differ from each other. Particularly, the second substrate which adheres the resin film thereto by way of the upper polarizer is reinforced by the resin film and hence, even when the thickness of the second substrate is smaller than the thickness of the first substrate, the second substrate can ensure a sufficient strength. However, depending on a kind of the display panel, for example, a charge preventing conductive film may be formed on a surface of the second substrate which faces the upper polarizer in an opposed manner. In such a case, it is impossible to reduce the thickness of the second substrate by grinding, for example. Accordingly, when the conductive film is formed on the second substrate, the thickness of the display panel may be reduced by making the first substrate thinner than the second substrate. Here, the thickness of the first substrate and the thickness of the second substrate may preferably be set such that the thickness of the display panel excluding the resin film is set to 1.4 mm or less, for example.

Further, in the display device of the present invention, the display panel may arrange the upper retardation plate between the second substrate and the upper polarizer, for example.

Further, in the display device of the present invention, the display panel may arrange a lower polarizer behind the first substrate as viewed from the viewer, for example. Here, a lower retardation plate may be arranged between the lower polarizer and the first substrate.

Here, in the display device of the present invention, both the first substrate and the second substrate of the display panel may preferably be formed of a glass substrate. Even when the glass substrate is used for forming the first substrate and the second substrate, the first substrate and the second substrate can ensure the sufficient strength with the use of the resin film and hence, the thicknesses of the respective glass substrates can be reduced. Accordingly, it is possible to realize both the reduction of the thickness of the display panel and the acquisition of the sufficient strength of the display panel simultaneously.

Further, in the display device of the present invention, provided that the display panel is formed of a display panel which has at least the first substrate, the second substrate, the upper polarizer and the resin film, any display panel may be used. However, it is particularly desirable to adopt a liquid crystal display panel which arranges (sandwiches) the liquid crystal layer between the first substrate and the second substrate. Here, the present invention is not limited to the liquid crystal display device which includes the liquid crystal display panel and may be a display device which includes a self-luminous-type display panel using organic EL elements, for example.

DESCRIPTION OF THE PREFERRED EMBODIMENTS

Hereinafter, the present invention is explained in detail in conjunction with modes for carrying out the invention (embodiments) by reference to drawings.

Here, in all drawings for explaining the embodiments, parts having identical functions are given same symbols and their repeated explanation is omitted.

Embodiment 1

Figure 1:
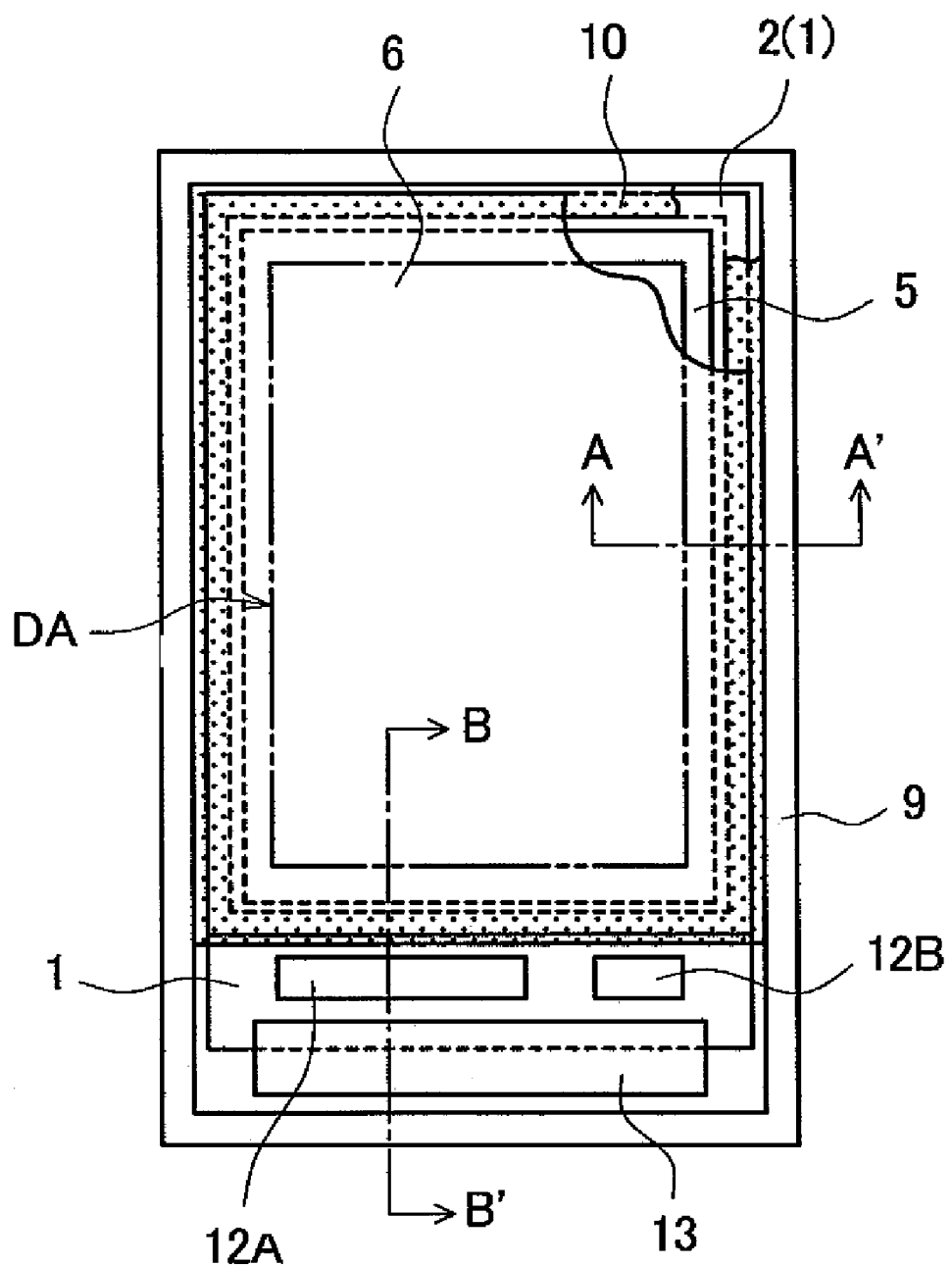
FIG. 1 is a schematic plan view showing the schematic constitution of a liquid crystal display panel of an embodiment 1 according to the present invention.
Figure 2:
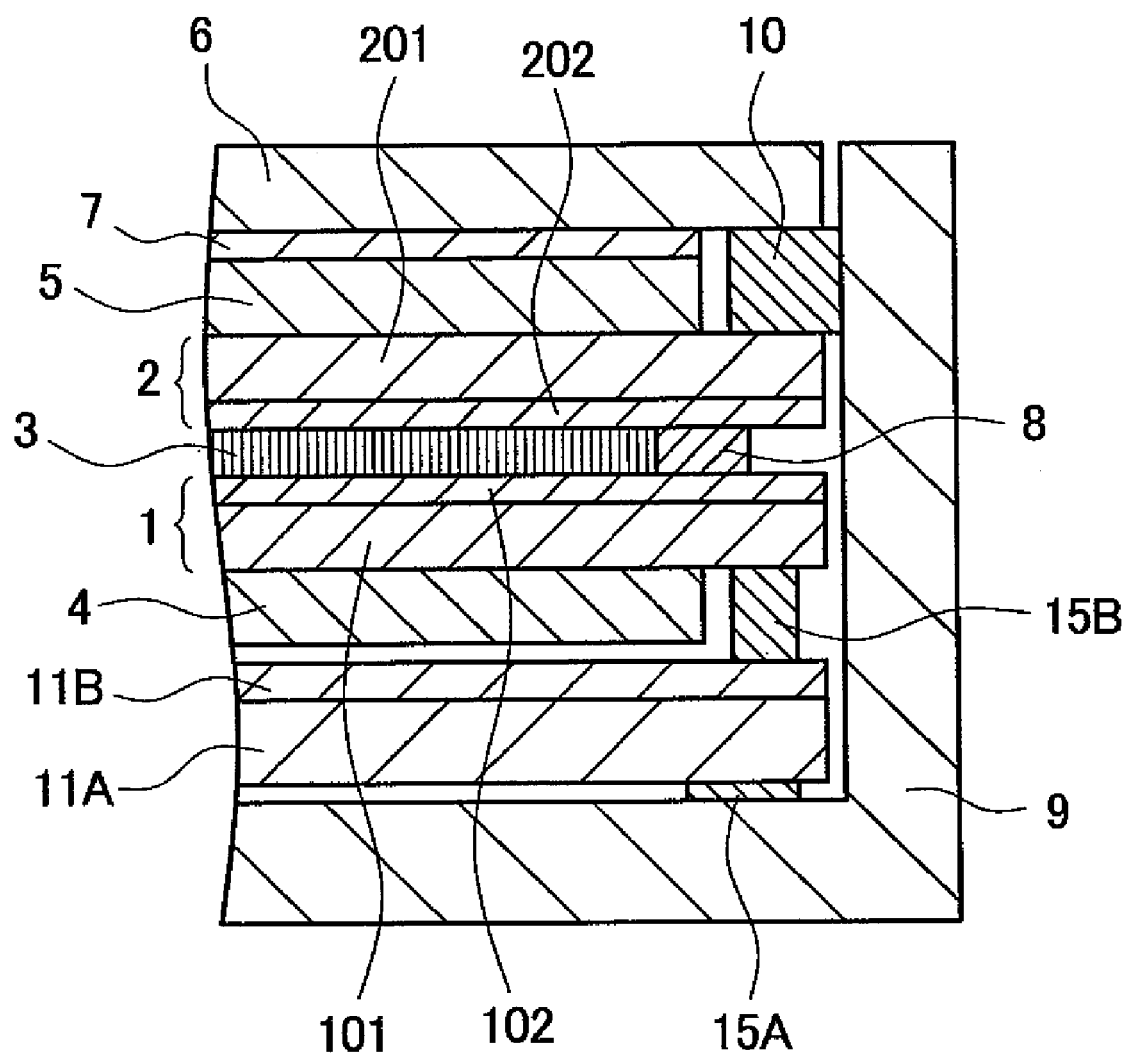
FIG. 2 is a schematic cross-sectional view taken along a line A-A' in FIG. 1.
Figure 3:
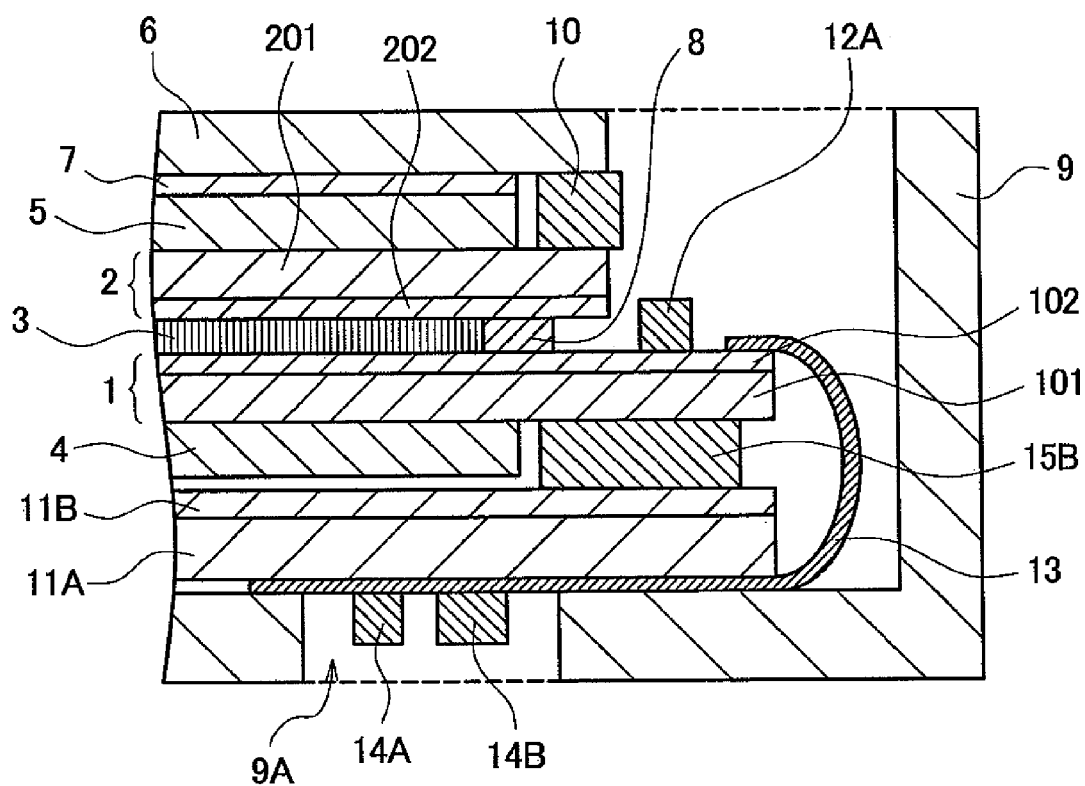
FIG. 3 is a schematic cross-sectional view taken along a line B-B' in FIG. 1.

FIG. 1 is a schematic plan view showing the schematic constitution of a liquid crystal display panel of an embodiment 1 according to the present invention. FIG. 2 is a schematic cross-sectional view taken along a line A-A' in FIG. 1. FIG. 3 is a schematic cross-sectional view taken along a line B-B' in FIG. 1.

In the embodiment 1, a transmissive liquid crystal display device is taken as an example of a display device to which the present invention is applied, and the constitution, the manner of operation and advantageous effects of the transmissive liquid crystal display device are explained herein after.

The liquid crystal display device of the embodiment 1 is provided with, for example, as shown in FIG. 1 to FIG. 3, a liquid crystal display panel, wherein the liquid crystal display panel includes a TFT substrate 1, a counter substrate 2, a liquid crystal material 3 which is sandwiched between the TFT substrate 1 and the counter substrate 2, a pair of polarizers 4, 5 which are arranged in a state that the pair of polarizers sandwich the TFT substrate 1 and the counter substrate 2 which, in turn, sandwich the liquid crystal material 3, and a resin film 6 which is brought into close contact with the polarizer 5 which is arranged on a counter-substrate-2 side by adhesion. Here, the resin film 6 is, for example, adhered to the polarizer 5 using a tacky adhesive material 7 or an adhesive material.

Further, the TFT substrate 1 and the counter substrate 2 are adhered to each other using an annular sealing material 8, and the liquid crystal material 3 is sealed in a sandwiched manner in a space defined by the TFT substrate 1, the counter substrate 2, and the sealing material 8.

The TFT substrate 1 includes a glass substrate 101 and a thin film stacked portion 102. Although the detailed explanation is omitted here, the thin film stacked portion 102 is formed by stacking a plurality of insulation layers, a plurality of conductive layers, a plurality of semiconductor layers and the like. For example, the thin film stacked portion 102 is formed of scanning signal lines (also referred to as gate signal lines), video signal lines (also referred to as drain signal lines), TFT elements, pixel electrodes and the like.

The counter substrate 2 includes a glass substrate 201 and a thin film stacked portion 202. Although the detailed explanation is omitted here, the thin film stacked portion 202 is formed by stacking a plurality of insulation layers, a plurality of conductive layers and the like. For example, the thin film stacked portion 202 is formed of color filters.

Here, when a vertical electric field method is adopted as a driving method of the liquid crystal display panel, in the thin film stacked portion 202 of the counter substrate 2, common electrodes which face the pixel electrodes of the TFT substrate 1 in an opposed manner are also formed. Further, when a lateral electric field method is adopted as the driving method of the liquid crystal display panel, the common electrodes are formed in the thin film stacked portion 102 of the TFT substrate 1.

Further, as the combination of the constitution of the thin film stacked portion 102 of the TFT substrate 1 and the constitution of the thin film stacked portion 202 of the counter substrate 2, any one of various combinations which are applied to a conventional liquid crystal display panel may be adopted. Accordingly, the detailed explanation of specific constitutional examples of the respective thin film stacked portions 102, 202 is omitted here.

Further, the liquid crystal display panel is, for example, housed in a resin-made support member 9 which is formed in a box shape. Here, the liquid crystal display panel is housed in the support member 9 in a state that the resin film 6, the polarizer 5, the counter substrate 2, the liquid crystal material 3, the TFT substrate 1, the polarizer 4 are arranged in this order in the viewing direction as viewed from a viewer. Then, as viewed from the viewer, a bottom surface of the support member 9 is arranged behind the polarizer 4. Here, in the explanation made herein after, the polarizer 5 which is arranged in front of the counter substrate 2 as viewed from the viewer is referred to as an upper polarizer and the polarizer 4 which is arranged behind the TFT substrate 1 is referred to as a lower polarizer.

The lower polarizer 4 is, for example, brought into close contact with the glass substrate 101 of the TFT substrate 1 by adhesion using a tacky adhesive material (not shown in the drawing). In the same manner, also the upper polarizer 5 is, for example, brought into close contact with the glass substrate 201 of the counter substrate 2 by adhesion using a tacky adhesive material (not shown in the drawing). Here, the upper polarizer 4 and the lower polarizer 5 are adhered to the glass substrates 101, 201 in a state that, for example, respective transmission axes of the polarizers (polarization axes) are arranged orthogonal to each other or in parallel to each other. The lower polarizer 4 and the upper polarizer 5 may be formed of, for example, a film-like polarizer which is used in a conventional liquid crystal display panel and hence, the detailed explanation of a specific constitutional example including a material is omitted here.

The resin film 6 is a film member which is arranged at a position closest to the viewer. Accordingly, it is favorable to use a film having high optical transmissivity, particularly, a color less transparent film as the resin film 6. For example, an acrylic resin or an epoxy resin is used as a material of the resin film 6. Here, the resin film 6 is brought in to close contact with the upper polarizer 5 by adhesion using the tacky adhesive material 7, for example.

Further, in the liquid crystal display device of the embodiment 1, an outer periphery of the upper polarizer 5 is arranged more inside than an outer periphery of the counter substrate 2 (glass substrate 201), and an outer periphery of the resin film 6 is arranged more outside than the outer periphery of the upper polarizer 5. Then, in regions of outer peripheral portions of the resin film 6 and the counter substrate 2 where the upper polarizer 5 is not interposed, a cushion material 10 is interposed. The cushion material 10 is, for example, formed in an annular shape to surround the periphery of the upper polarizer 5, is brought into close contact with the resin film 6 and the counter substrate 2, and is brought into close contact with an inner surface of the support member 9.

Further, in the transmissive liquid crystal display device, a backlight is arranged between the lower polarizer 4 of the liquid crystal display panel and a bottom surface of the support member 9. FIG. 2 and FIG. 3 show a constitutional example of a backlight which is referred to as an edge-type backlight, wherein a light guide plate 11A which guides light emitted from a light source (not shown in the drawing) to a display surface of the liquid crystal display panel and an optical sheet 11B such as a diffuser are arranged between the lower polarizer 4 and a bottom surface of the support member 9. Here, the light source is, for example, arranged outside an end surface of the outer periphery of the light guide plate 11A not shown in the drawing.

Further, the liquid crystal display device of the embodiment 1 is a display device which is applicable to a display part of a mobile phone terminal, and the TFT substrate 1 and the counter substrate 2 are overlapped to each other in a state that respective three sides of the TFT substrate 1 and the counter substrate 2 agree with each other. Then, in a region of the TFT substrate 1 where the TFT substrate 1 is not overlapped to the counter substrate 2, for example, driver ICs (semiconductor chips) 12A, 123 are mounted to drive the TFT elements. Further, to an end portion (side) of the region of the TFT substrate 1 where the TFT substrate 1 is not overlapped to the counter substrate 2, one end of a flexible printed circuit board 13 is connected.

The flexible printed circuit board 13 is bent in the vicinity of one end thereof which is connected to the TFT substrate 1, and another-end side of the flexible printed circuit board 13 is arranged between the support member 9 and the light guide plate 11A. Here, an opening portion 9A is formed in the bottom surface of the support member 9, while circuit parts 14A, 14B are mounted on the flexible printed circuit board 13 at a position corresponding to the opening portion 9A.

Further, in the liquid crystal display device of the embodiment 1, for example, a first spacer 15A is interposed between the bottom surface of the support member 9 and the light guide plate 11A, while a second spacer 15B is interposed between the optical sheet 11B and the TFT substrate 1 (glass substrate 101).

To briefly explain assembling steps of the liquid crystal display device of the embodiment 1, first of all, a liquid crystal display panel in a state that the resin film 6 is not adhered to the liquid crystal display panel, the flexible printed circuit board 13, and the backlight are housed in the support member 9. Here, on a surface of the upper polarizer 5 to which the resin film 6 is adhered, for example, the tacky adhesive material 7 and a cover film are mounted. Next, the cushion material 10 is arranged on an outer peripheral portion of the counter substrate 2 of the liquid crystal display panel. Thereafter, the cover film is removed and the resin film 6 is adhered to the upper polarizer 5. By assembling the liquid crystal display device in accordance with such steps, the liquid crystal display device shown in FIG. 1 to FIG. 3 can be obtained.

Figure 4:
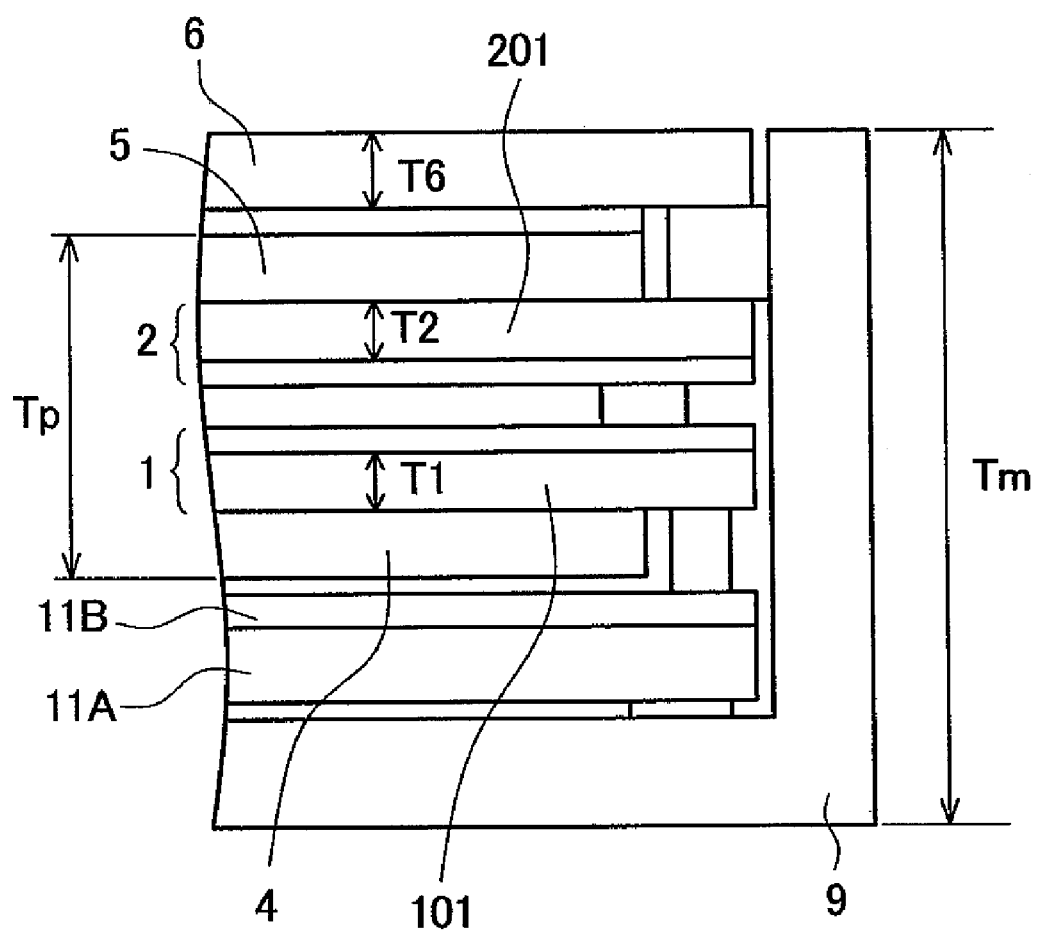
FIG. 4 is a schematic view for explaining the manner of operation and advantageous effects of a liquid crystal display device of the embodiment 1.

FIG. 4 is a schematic view for explaining the manner of operation and advantageous effects of the liquid crystal display device of the embodiment 1.

In the liquid crystal display device of the embodiment 1, the liquid crystal display panel has the resin film 6 adhered to the upper polarizer 5 using the tacky adhesive material 7. The resin film 6 is used as a reinforcing member for reinforcing the liquid crystal display panel. Accordingly, it is favorable to set a thickness T6 of the resin film 6 shown in FIG. 4 to, for example, 0.2 mm or more and 2 mm or less. Assuming that the thickness T6 of the resin film 6 is 0.2 mm or more, for example, even when a thickness T1 of the glass substrate 101 of the TFT substrate 1 and a thickness T2 of the glass substrate 201 of the counter substrate 2 are respectively set to 0.5 mm or less, it is possible to sufficiently ensure a strength of the liquid crystal display panel. Accordingly, in the liquid crystal display panel of the embodiment 1, even when a total thickness Tp of the display panel excluding the resin film 6 and the tacky adhesive material 7 is set to, for example, 1.4 mm or less, it is possible to ensure the sufficient strength.

Further, since the liquid crystal display panel can ensure the sufficient strength even when the total thickness Tp of the liquid crystal display panel excluding the resin film 6 and the tacky adhesive material 7 is set to 1.4 mm or less, even when a total thickness of a thickness of the bottom surface of the support member 9 and thicknesses of the light guide plate 11A and the optical sheet 11B, for example, is equal to a corresponding total thickness of the conventional liquid crystal display device, it is possible to reduce the thickness Tm of the liquid crystal display device.

Further, in FIG. 4, the thickness T1 of the glass substrate 101 of the TFT substrate 1 and the thickness T2 of the glass substrate 201 of the counter substrate 2 are set substantially equal to each other. However, the present invention is not limited to such setting of thicknesses, and the thicknesses T1, T2 of the respective glass substrates may be set different from each other. The resin film 6 functions as a reinforcing member of the liquid crystal display panel and hence, it is possible to set, for example, the thickness T2 of the glass substrate 201 of the counter substrate 2 to which the resin film 6 is adhered smaller than the thickness T1 of the glass substrate 101 of the TFT substrate 1. Accordingly, the total thickness Tp of the display panel excluding the resin film 6 and the tacky adhesive material 7 can be further reduced.

Figure 5:
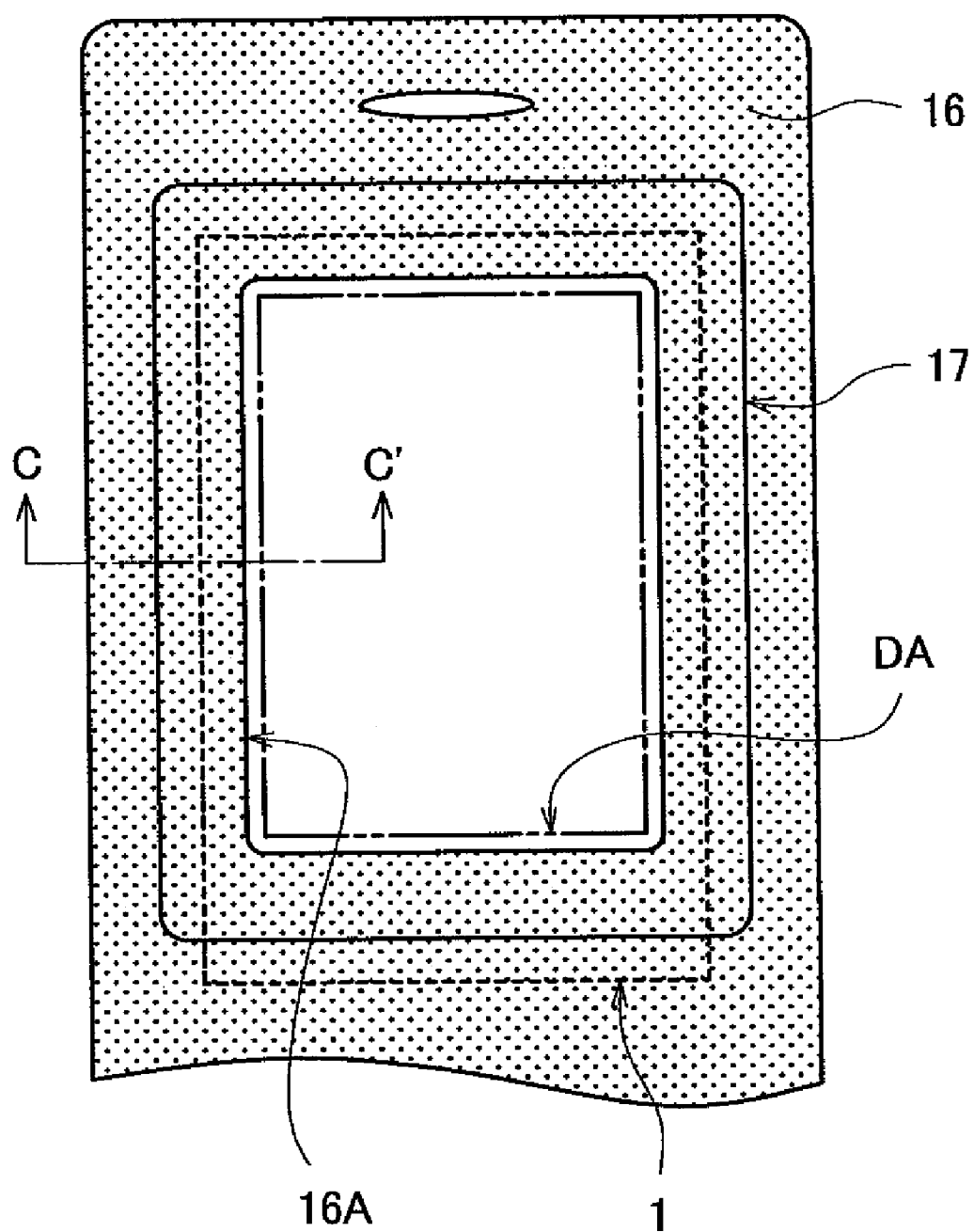
FIG. 5 is a schematic front view showing the schematic constitution of a display part of a conventional mobile phone terminal.
Figure 6:
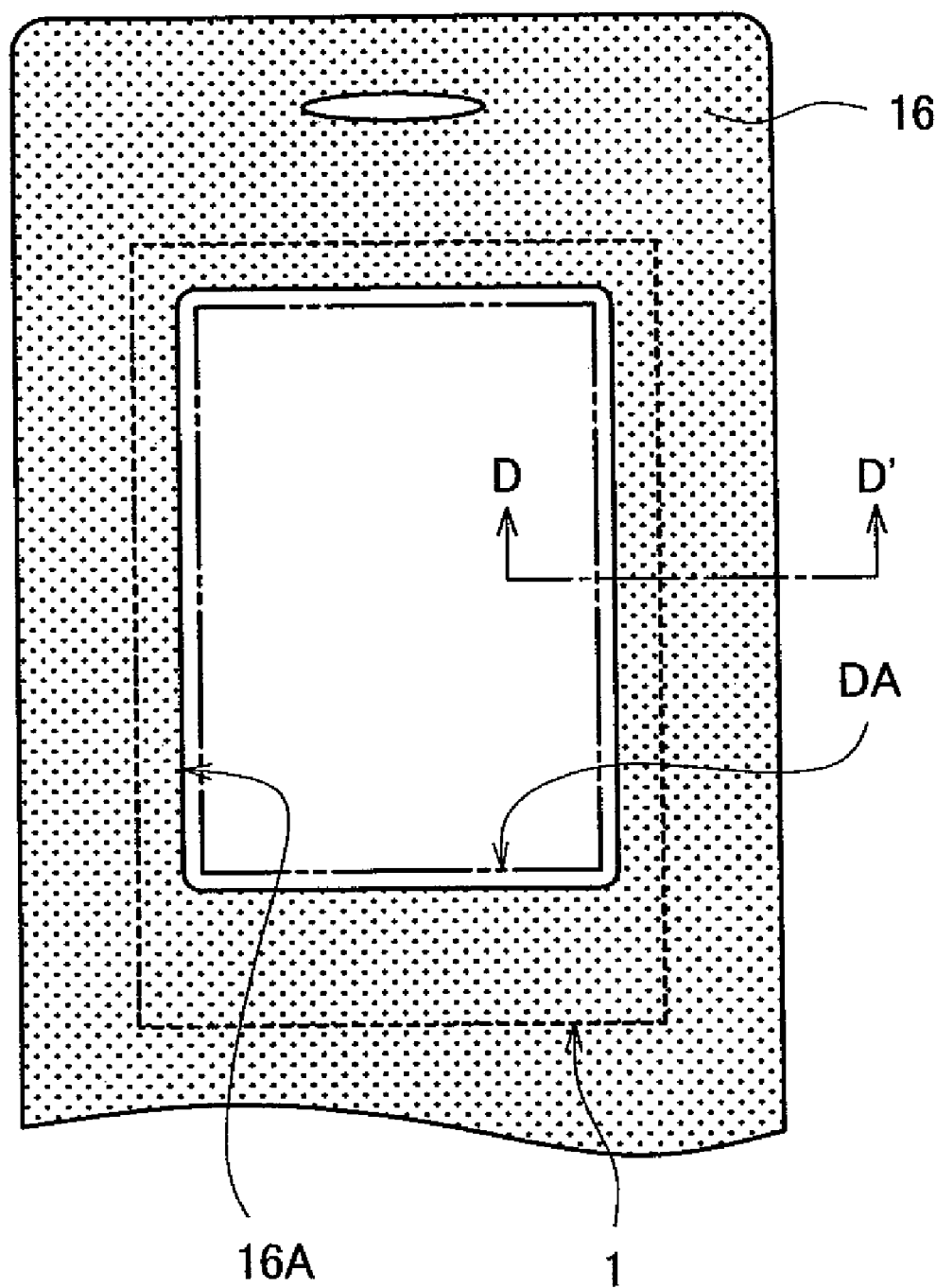
FIG. 6 is a schematic front view showing the schematic constitution of a display part of a mobile phone terminal in which a liquid crystal display device of the embodiment 1 is used.
Figure 7:
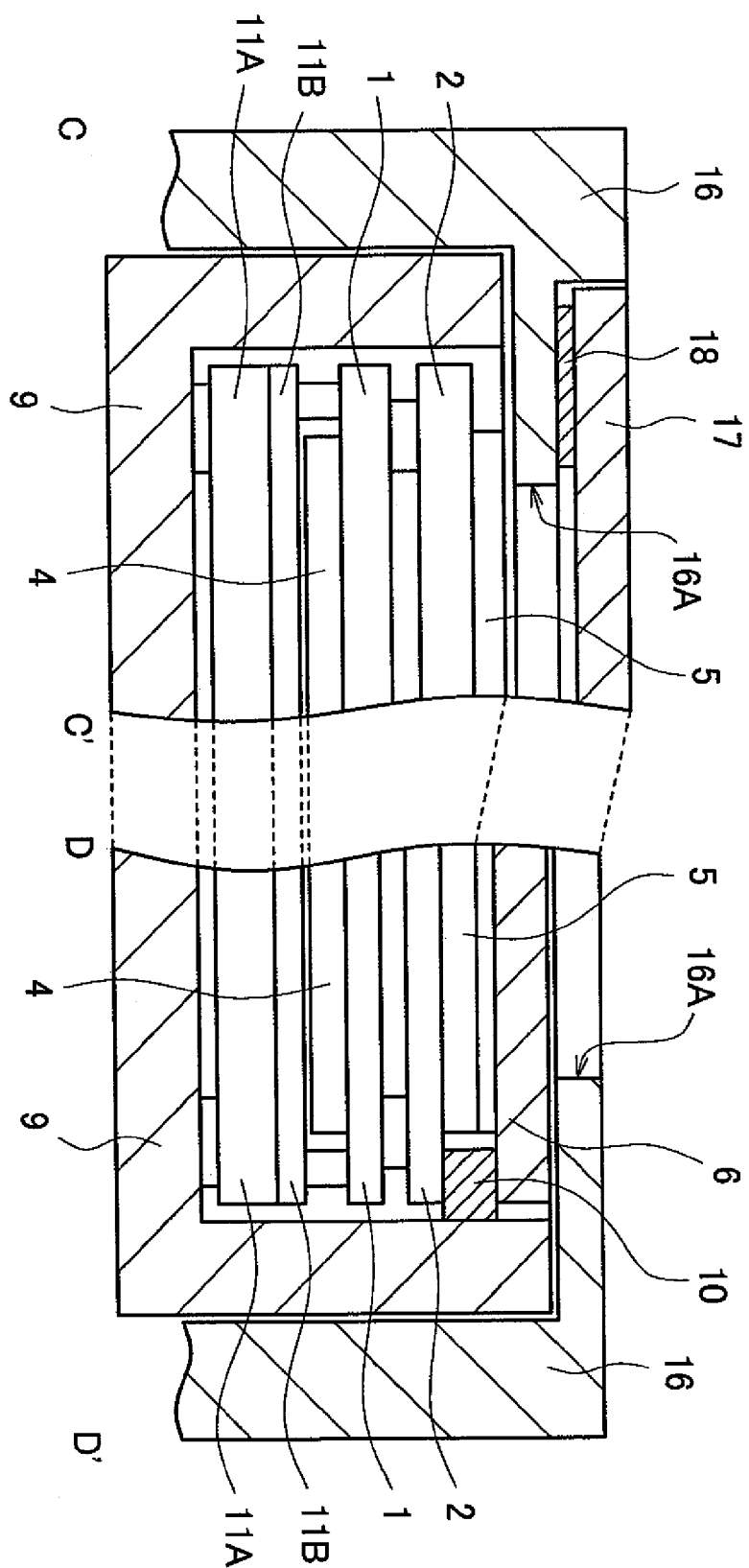
FIG. 7 is a view in which a cross-sectional view taken along a line C-C' in FIG. 5 and a cross-sectional view taken along a line D-D' in FIG. 6 are arranged in parallel in the lateral direction.

FIG. 5 to FIG. 7 are schematic views for explaining one example of the portable electronic equipment to which the liquid crystal display device of the embodiment 1 is preferably applicable and the manner of operation and advantageous effects of the portable electronic equipment.

FIG. 5 is a schematic front view showing the schematic constitution of the display part of the conventional mobile phone terminal. FIG. 6 is a schematic front view showing the schematic constitution of a display part of a mobile phone terminal to which the liquid crystal display device of the embodiment 1 is applicable. FIG. 7 is a view in which a cross-sectional view taken along a line C-C' in FIG. 5 and a cross-sectional view taken along a line D-D' in FIG. 6 are arranged in parallel in the lateral direction. Here, with respect to two cross-sectional views shown in FIG. 7, the view on the left is the cross-sectional view taken along a line C-C' in FIG. 5, and the view on the right is the cross-sectional view taken along a line D-D' in FIG. 6.

The liquid crystal display device of the embodiment 1 is a display panel which is preferably applicable to the display device (display module) of the portable electronic equipment such as the mobile phone terminal.

With respect to the liquid crystal display device which is applicable to the conventional mobile phone terminal, as shown in the left sides of FIG. 5 and FIG. 7, for example, the liquid crystal display panel in which the upper polarizer 5, the counter substrate 2, the liquid crystal material (liquid crystal layer) 3, the TFT substrate 1, and the lower polarizer 4 are arranged in this order in the viewing direction as viewed from a viewer is housed in the support member 9. Here, the resin film 6 is not adhered to the upper polarizer 5. Further, in the case of the transmissive liquid crystal display device, an optical sheet 11B of a backlight and a light guide plate 11A are arranged behind the lower polarizer 4 as viewed from a viewer.

With respect to the above-mentioned mobile phone terminal, the liquid crystal display device is housed in an exterior (casing) 16 which is opened such that a display region DA of the liquid crystal display panel can be viewed. Further, in the conventional mobile phone terminal, in general, a transparent protective cover 17 is arranged such that the transparent protective cover 17 covers an opening portion 16A of the exterior 16. Here, in many cases, the protective cover 17 is fitted into a recess formed in a surface of the exterior 16 and the protective cover 17 is adhered to the exterior 16 using a tacky adhesive material 18, for example. The protective cover 17, for example, prevents the formation of flaws on the surface (upper polarizer 5) of the liquid crystal display panel or prevents the cracking of the liquid crystal display panel due to the application of the pressure to the liquid crystal display panel.

In this manner, the mobile phone terminal which uses the conventional liquid crystal display device requires the protective cover 17 which protects the liquid crystal display panel and hence, the display part becomes thicker by the thickness of the protective cover correspondingly.

To the contrary, according to the liquid crystal display device of the embodiment 1, the strength of the liquid crystal display panel is increased by laminating the resin film 6 to the upper polarizer 5 and hence, it is possible to reduce the thicknesses of the glass substrate 101 of the TFT substrate 1 and the glass substrate 201 of the counter substrate 2 compared to thicknesses of corresponding parts of the conventional liquid crystal display device. Accordingly, in the display device of the embodiment 1, for example, as shown in FIG. 6 and FIG. 7, the thickness of a portion of the liquid crystal display panel which is constituted of the lower polarizer 4, the TFT substrate 1, the liquid crystal material 3, the counter substrate 2 and the upper polarizer 5 can be reduced compared to the thickness of a corresponding part of the conventional liquid crystal display panel.

Further, in the liquid crystal display device of the embodiment 1, for example, by setting a surface pencil hardness of a surface of the resin film 6, that is, a surface of the resin film 6 which faces a viewer to 3H or more, it is possible to make the formation of the flaws on the surface of the resin film 6 difficult. Here, the surface pencil hardness is a hardness which is expressed by a hardness which forms flaws on a surface of a material when a line is drawn on the surface of the material with a pencil. That is, the fact that the surface pencil hardness is 3H implies that no flaws are formed on the surface of the resin film when a line is drawn on the resin film 6 with a pencil having a core of 3H or of hardness softer than 3H.

That is, the liquid crystal display device of the embodiment 1 may also impart a function of a conventional protective cover 17 to the resin film 6. Accordingly, when the liquid crystal display device of the embodiment 1 is housed in the exterior 16 of the mobile phone terminal, for example, even when the protective cover 17 is not adhered as shown in FIG. 6 and FIG. 7, it is possible to prevent the formation of flaws on the surface (upper polarizer 5) of the liquid crystal display panel or to prevent the cracking of the liquid crystal display panel due to the application of the pressure to the liquid crystal display panel.

Here, in setting the surface pencil hardness of the resin film 6 to 3H or more, a material having a hardness equivalent to the pencil hardness of 3 or more may be formed in a film shape or a material having an arbitrary pencil hardness may be formed in a film shape and, thereafter, hard coat treatment is applied to a surface of the film thus making the pencil hardness of the surface to 3H or more. When an acrylic resin or an epoxy resin is used as the material of the resin film 6, for example, it is possible to set the surface pencil hardness to 3H or more without applying the hard coat treatment to the surface. Accordingly, the resin film 6 may preferably be made of the acrylic resin or the epoxy resin.

Due to such a constitution, in a mobile phone terminal which uses the liquid crystal display device of the embodiment 1, a thickness from a bottom surface of the support member 9 to a surface at which an opening portion 16A of the exterior 16 is formed can be reduced compared to a corresponding thickness of a conventional mobile phone terminal. As a result, a thickness of a display part of the mobile phone terminal can be reduced compared to a thickness of a corresponding display part of the conventional mobile phone terminal.

Further, in the display part of the conventional mobile phone terminal, an air layer is formed between the liquid crystal display panel and the protective cover 17. However, with the use of the liquid crystal display device of the embodiment 1, such an air layer can be eliminated. Accordingly, the liquid crystal display device of the embodiment 1 can enhance a display efficiency compared to a corresponding display efficiency of the conventional liquid crystal display device.

Further, in the liquid crystal display device of the embodiment 1, the TFT substrate 1 and the counter substrate 2 may be manufactured using the glass substrates 101, 201. Accordingly, compared to the liquid crystal display panel described in patent document 1 which uses the plastic substrate, the thin film stacked portions 102, 202 can be easily formed. Further, by manufacturing the TFT substrate 1 and the counter substrate 2 using the glass substrates 101, 201, it is possible to prevent the occurrence of the display irregularities attributed to a change of an environment.

Here, as shown in FIG. 6 and FIG. 7, in the mobile phone terminal which does not adhere the protective cover 17 to the exterior 16, moisture or the like is liable to easily enter the inside of the exterior through a gap which is formed between an end of an opening portion 16A of the exterior 16 and the resin film 6 and hence, lines which are formed on the TFT substrate 1 of the liquid crystal display panel, lines which are formed on other printed circuit boards and the like are liable to be easily corroded. However, in the liquid crystal display device of the embodiment 1, outside the outer periphery of the upper polarizer 5, for example, the cushion material 10 which is brought into close contact with the counter substrate 2 and the resin film 6 respectively and, at the same time, is brought into close contact with an inner surface of the support member 9 is arranged. Accordingly, even when moisture or the like enter the inside of the exterior 16, the cushion material 10 constitutes a wall thus preventing the entered moisture from reaching an end surface of the outer periphery of the upper polarizer 5. As the result, the end surface of the outer periphery of the upper polarizer 5 is hardly corroded or deteriorated thus lowering a possibility that the upper polarizer 5 is peeled off from the counter substrate 2 (glass substrate 201) or the upper polarizer 5 causes display irregularities.

Figure 8:
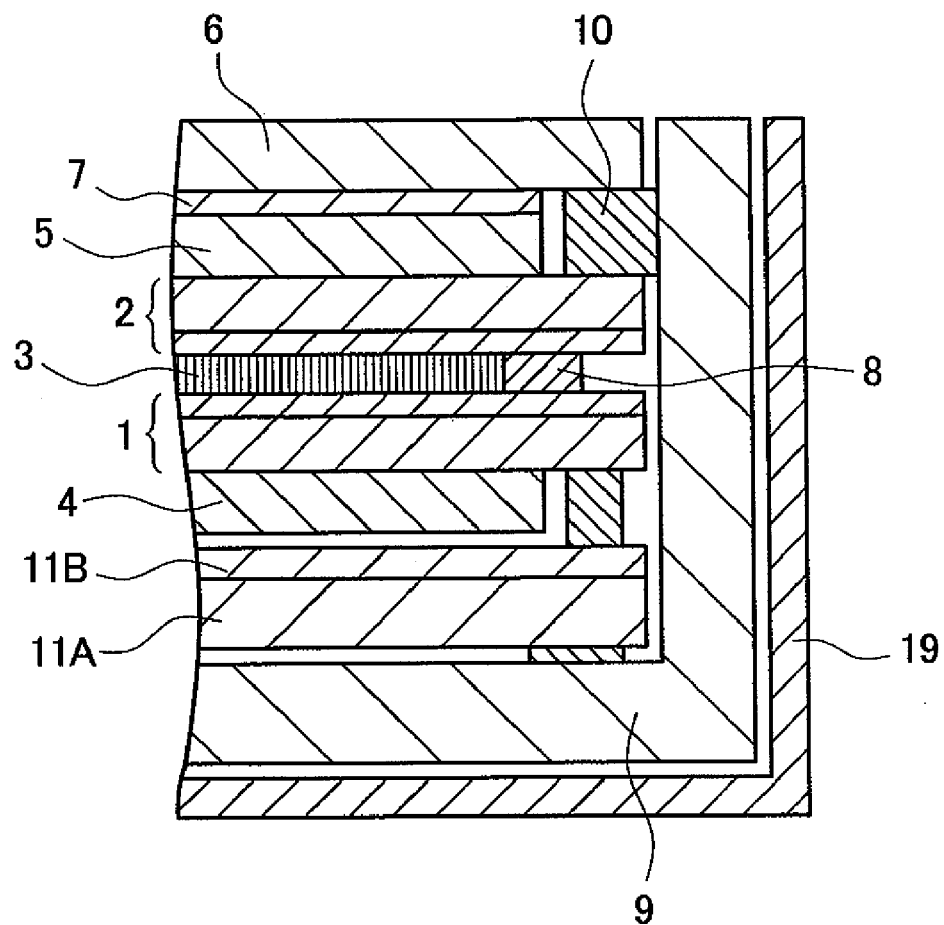
FIG. 8 is a schematic cross-sectional view for explaining a first modification of the liquid crystal display device of the embodiment 1.

FIG. 8 is a schematic cross-sectional view for explaining a first modification of the liquid crystal display device of the embodiment 1. Here, a cross section shown in FIG. 8 is equal to the cross section shown in FIG. 2. That is, FIG. 8 shows the constitution of the cross section taken along the line A-A' in FIG. 1.

The liquid crystal display device of the embodiment 1 is essentially characterized in that the resin film 6 is arranged on the side closer to the viewer than the upper polarizer 5 of the liquid crystal display panel and, at the same time, the resin film 6 is brought into close contact with the upper polarizer 5 by adhesion. Accordingly, with respect to other constitutions of the liquid crystal display device of the embodiment 1, it is needless to say that various constitutions which are applied to the conventional liquid crystal display device can be applied.

That is, in the liquid crystal display device of the embodiment 1, for example, as shown in FIG. 8, a frame member 19 made of metal such as stainless steel, for example, may be arranged outside the support member 9. Here, frame member 19 may be formed in a box-shape, for example, wherein the support member 9 in which the liquid crystal display panel and the backlight are housed may be housed such that an open end of the frame member 19 and an open end of the support member 9 are aligned with each other.

Figure 9:
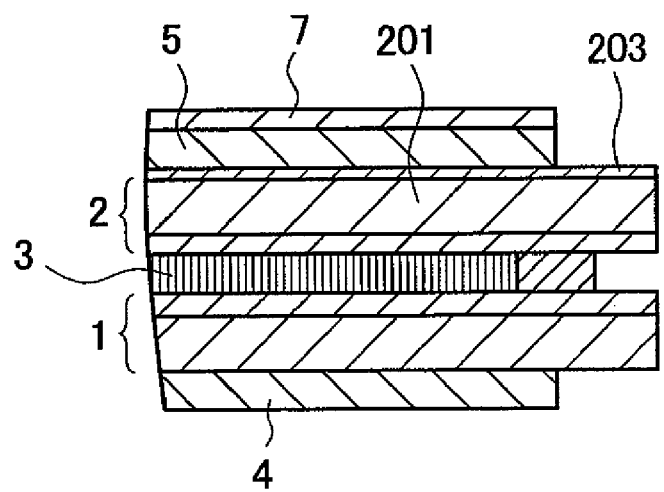
FIG. 9 is a schematic cross-sectional view for explaining a second modification of the liquid crystal display device of the embodiment 1.

FIG. 9 is a schematic cross-sectional view for explaining a second modification of the liquid crystal display device of the embodiment 1. Here, a cross section shown in FIG. 9 is equal to the cross section shown in FIG. 2. That is, FIG. 9 shows the cross-sectional constitution from the lower polarizer 4 to the upper polarizer 5 and the tacky adhesive material 7 in the cross-sectional constitution taken along the line A-A' in FIG. 1.

In the liquid crystal display device of the embodiment 1, with respect to the constitution of the liquid crystal display panel, the constitution ranging from the lower polarizer 4 to the upper polarizer 5 may adopt various constitutions which are applied to the conventional liquid crystal display panel. That is, in the liquid crystal display device of the embodiment 1, the counter electrodes which face the pixel electrodes formed on the TFT substrate 1 may be formed on the thin film stacked portion 202 of the counter substrate 2 or may be formed on the thin film stacked portion 102 of the TFT substrate 1.

When the liquid crystal display panel is a lateral-field-drive-type display panel which is referred to as IPS (In Plane Switching) display panel, for example, the counter electrodes are formed on the thin film stacked portion 102 of the TFT substrate 1. Accordingly, for example, as shown in FIG. 9, a charge preventing conductive film 203 may be formed on a back surface of the glass substrate 201 of the counter substrate 2, that is, on a surface of the glass substrate 201 to which the upper polarizer 5 is adhered. The conductive film 203 may be, for example, formed of a transparent conductive body made of ITO or the like.

When the conductive film 203 is formed on the back surface of the glass substrate 201 of the counter substrate 2, it is impossible to reduce the thickness of the glass substrate 201 by grinding the back surface. However, it is possible to polish the back surface of the glass substrate 101 of the TFT substrate 1, that is, the surface of the glass substrate 101 to which the lower polarizer 4 is adhered. Accordingly, by setting the thickness T1 of the glass substrate 101 of the TFT substrate 1 smaller than the thickness T2 of the glass substrate 201 of the counter substrate 2 by grinding the glass substrate 101, it is possible to reduce a total thickness Tp of the display panel excluding the resin film 6 and the tacky adhesive material 7.

Figure 10:
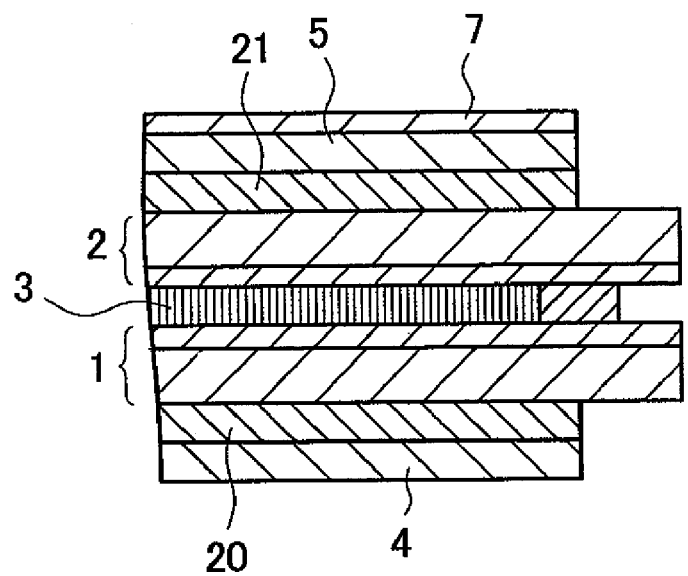
FIG. 10 is a schematic cross-sectional view for explaining a third modification of the liquid crystal display device of the embodiment 1.

FIG. 10 is a schematic cross-sectional view for explaining a third modification of the liquid crystal display device of the embodiment 1. Here, a cross section shown in FIG. 10 is equal to the cross section shown in FIG. 2. That is, FIG. 10 shows the cross-sectional constitution from the lower polarizer 4 to the upper polarizer 5 and the tacky adhesive material 7 in the cross-sectional constitution taken along the line A-A' in FIG. 1.

In the explanation made heretofore, the explanation is made with respect to a case in which, as the constitutional example of the liquid crystal display panel, the lower polarizer 4 is brought into close contact with the TFT substrate 1 by adhesion and the upper polarizer 5 is brought into close contact with the counter substrate 2 by adhesion. However, the liquid crystal display device of the embodiment 1 is not limited to such a constitution. For example, as shown in FIG. 10, a lower retardation plate 20 may be arranged between the TFT substrate 1 and the lower polarizer 4, and an upper retardation plate 21 may be arranged between the counter substrate 2 and the upper polarizer 5.

In the liquid crystal display panel in which the lower retardation plate 20 and the upper retardation plate 21 are arranged, a lower circularly polarizer which is constituted of the lower polarizer 4 and the lower retardation plate 20 and an upper circularly polarizer which is constituted of the upper polarizer 5 and the upper retardation plate 21 are arranged to establish the relationship of upper circularly polarizer/liquid crystal layer/lower circularly polarizer and the relationship of (upper circularly polarizer angle)⊥(lower circularly polarizer angle). Here, as the constitution of the lower retardation plate 20 and the constitution of the upper retardation plate 21, various constitutions which are applied to the conventional liquid crystal display panel in which the lower retardation plate and the upper retardation plate are arranged may be applied.

Further, the liquid crystal display device of the embodiment 1 may be of a semi-transmissive type, for example. The semi-transmissive liquid crystal display device includes a transmissive region and a reflective region in one pixel region, for example, wherein the schematic constitution of a display panel excluding the resin film 6 may adopt the constitution shown in FIG. 10, for example.

Figure 11:
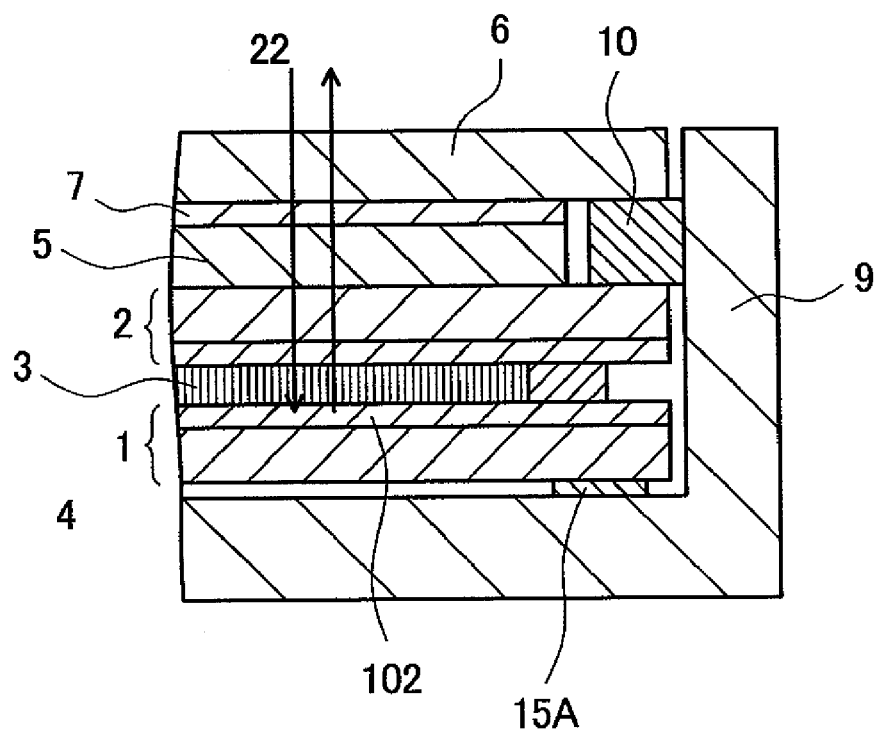
FIG. 11 is a schematic cross-sectional view for explaining a fourth modification of the liquid crystal display device of the embodiment 1.

FIG. 11 is a schematic cross-sectional view for explaining a fourth modification of the liquid crystal display device of the embodiment 1. Here, a cross section shown in FIG. 11 is equal to the cross section shown in FIG. 2. That is, FIG. 11 shows the cross-sectional constitution taken along the line A-A' in FIG. 1.

In the explanation made heretofore, the explanation is made by taking the transmissive liquid crystal display device as an example. However, it is needless to say that the liquid crystal display device of the embodiment 1 is not limited to the transmissive liquid crystal display device and the semi-transmissive liquid crystal display device and is also a reflective liquid crystal display device.

In the reflective liquid crystal display device, different from the transmissive liquid crystal display device, for example, as shown in FIG. 11, light 22 which is incident on a resin film 6 from the outside of the device is reflected on a thin film stacked portion 102 of a TFT substrate 1 and is radiated to a viewer's side. Accordingly, it is unnecessary to arrange a lower polarizer 4 and a backlight behind the TFT substrate 1 as viewed from the viewer.

Also in such a reflective liquid crystal display device, by bringing the resin film 6 into close contact with an upper polarizer 5 by adhesion, for example, even when a thickness of a glass substrate 101 of the TFT substrate 1 or a thickness of a glass substrate of a counter substrate 2 is reduced by grinding, the liquid crystal display device can ensure a sufficient strength. Accordingly, it is possible to realize both the further reduction of the thickness of the liquid crystal display device and the acquisition of the sufficient strength of the liquid crystal display device simultaneously.

Here, in the embodiment 1, as one example of display devices to which the present invention is preferably applicable, the liquid crystal display device is named. However, the present invention is not limited to the liquid crystal display device and may be also applicable to a self-luminous-type display device which uses organic EL (Electro Luminescence) elements, for example.

Figure 12:
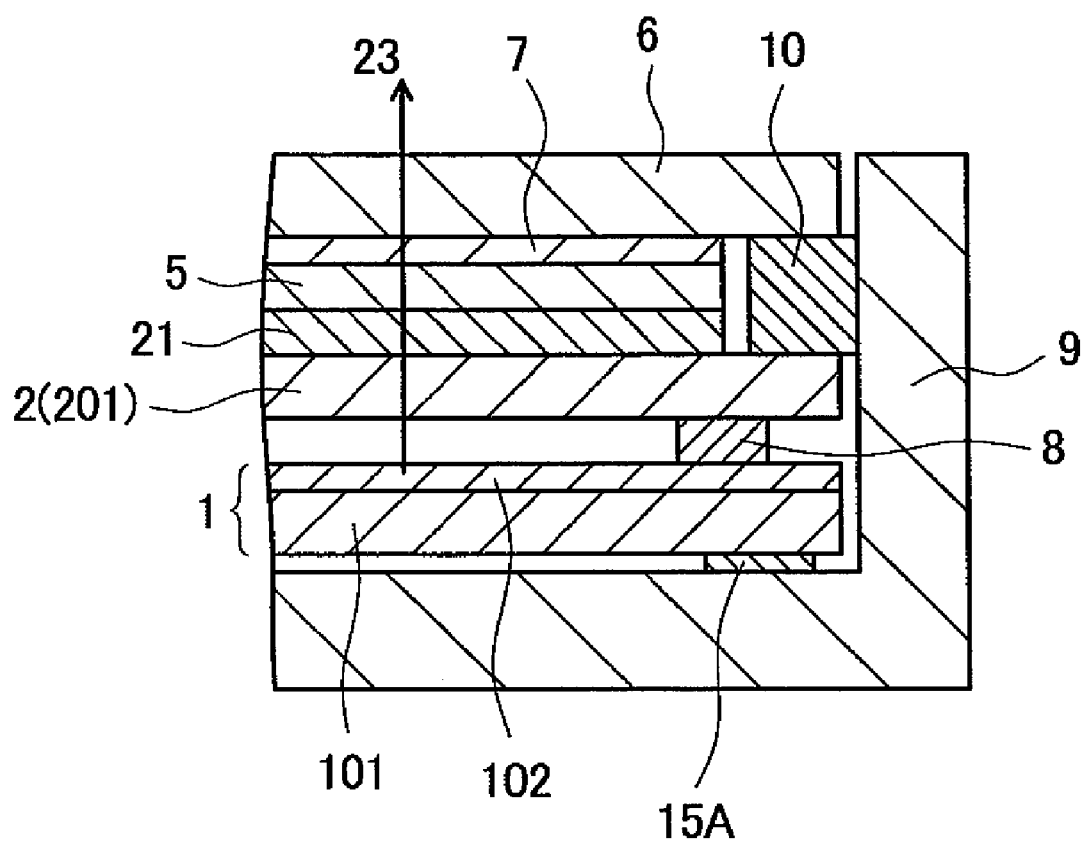
FIG. 12 is a schematic cross-sectional view for explaining a variation of the embodiment 1.

FIG. 12 is a schematic cross-sectional view for explaining a variation of the embodiment 1. Here, a cross section shown in FIG. 12 is equal to the cross section shown in FIG. 2. That is, FIG. 12 shows the cross-sectional constitution corresponding to the cross-sectional constitution taken along the line A-A' in FIG. 1.

A display panel which uses organic EL elements includes, for example, as shown in FIG. 12, a TFT substrate 1, a counter substrate 2 (glass substrate 201) and a retardation plate 21 and a polarizer 5 which are adhered to the counter substrate 2. Here, in applying the constitution of the embodiment 1 to the display panel using the organic EL element, a resin film 6 is brought into close contact with the polarizer 5 by adhesion using a tacky adhesive material 7 or the like.

Further, the display panel which uses the organic EL elements includes, for example, light emitting layers which use an organic EL material on a thin film stacked portions 102 of the TFT substrate 1, and gray scales of respective pixels are controlled in response to turning on and off of the light emitting layers and the brightness of light 23 at the time of turning on the light emitting layers. Accordingly, the inside of a space surrounded by the TFT substrate 1, the counter substrate 2 and a sealing material 8 is held in a vacuum state. Further, different from the liquid crystal display panel, the thin film stacked portion 202 may not be formed on the counter substrate 2.

Further, in the display panel which uses the organic EL elements, a circularly polarizer is constituted by combining the polarizer 5 and the retardation plate 21 thus preventing the reflection of an external light. Here, as the retardation plate 21, for example, only a λ/4 retardation plate may be used or a λ/4 retardation plate and a λ/2 retardation plate may be used in an overlapped manner. When the retardation plate 21 which is formed by overlapping the λ/4 retardation plate and the λ/2 retardation plate and the polarizer 5 are combined, it is possible to constitutes a wide-band circularly polarizer.

Also in such a display panel which uses the organic EL elements, by bringing a resin film 6 made of an acrylic resin or an epoxy resin, for example, into close contact with the polarizer 5 by adhesion, it is possible to increase a strength of a display panel. Accordingly, a thickness of a glass substrate 101 of the TFT substrate 1 and a thickness of the counter substrate 2 (glass substrate 201) may be reduced by grinding the glass substrate 101, 201.

Further, by arranging outer peripheries of the polarizer 5 and the retardation plate 21 more inside than an outer periphery of the counter substrate 2 (glass substrate 201) and, at the same time, by arranging an outer periphery of the resin film 6 more outside than an outer periphery of the polarizer 5, it is possible to interpose a cushion material 10 between the counter substrate 2 (glass substrate 201) and the resin film 6 outside the outer periphery of the upper polarizer 5. Accordingly, the cushion material 10 prevents the further intrusion of moisture or the like which intrudes from the outside of the device thus preventing the moisture or the like from reaching the polarizer 5 and the retardation plate 21. As a result, it is possible to reduce a possibility that the polarizer 5 or the retardation plate 21 is peeled off or the display irregularities are generated due to the corrosion or deterioration from end surfaces of outer periphery of the polarizer 5 and the retardation plate 21.

Here, it is needless to say that the constitution of the display device explained in conjunction with the embodiment 1 is not limited to the liquid crystal display panel and the display panel which uses the organic EL elements and is applicable to various display devices provided with a display panel having the constitution similar to the above-mentioned constitution.

Embodiment 2

Figure 13:
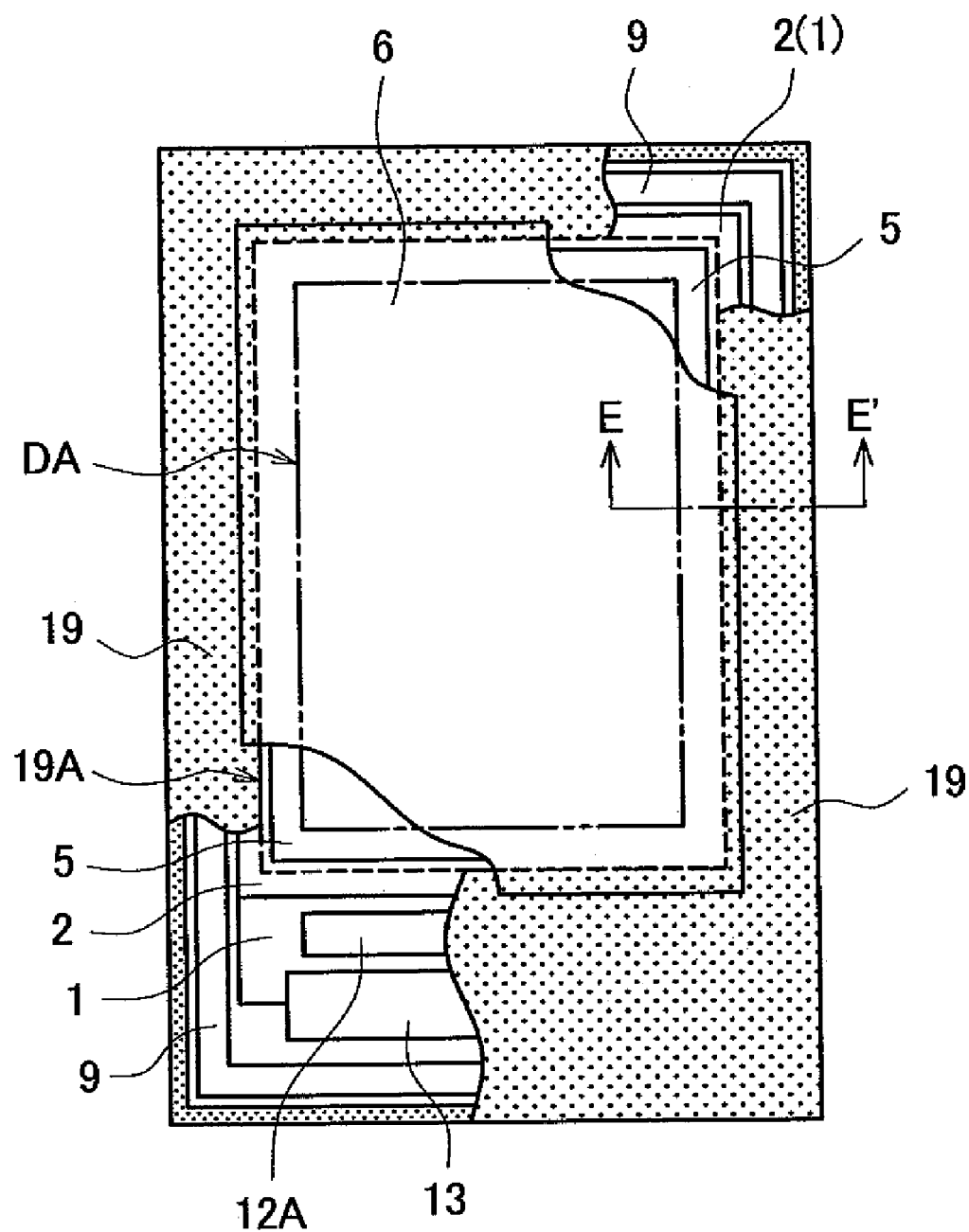
FIG. 13 is a schematic plan view showing the schematic constitution of a liquid crystal display device of an embodiment 2 according to the present invention.
Figure 14:
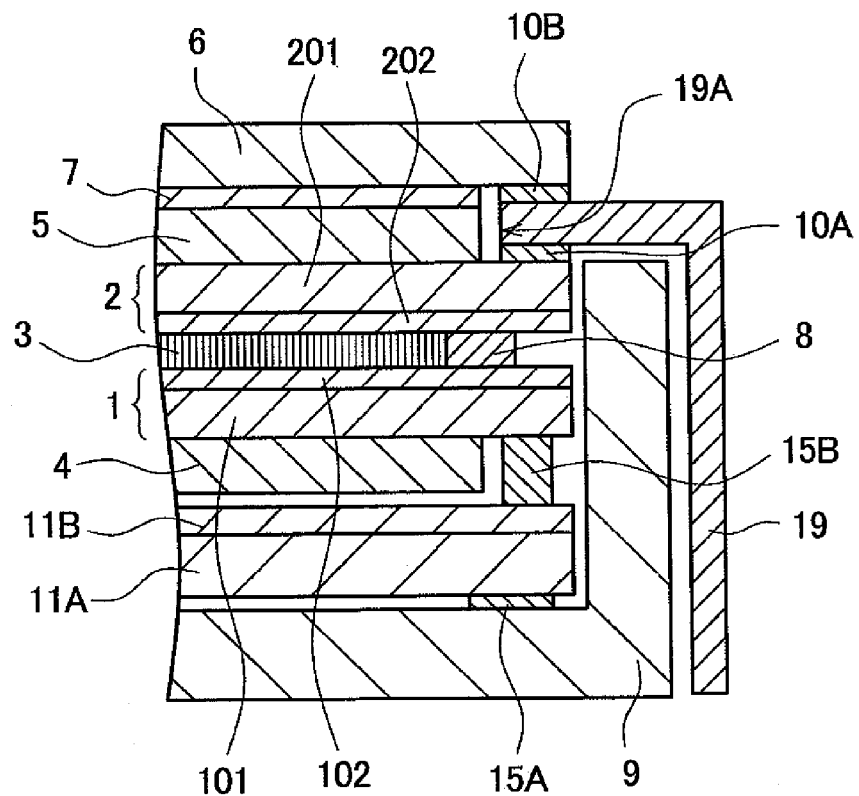
FIG. 14 is a schematic cross-sectional view taken along a line E-E' in FIG. 13.

FIG. 13 is a schematic plan view showing the schematic constitution of a liquid crystal display device of an embodiment 2 according to the present invention. FIG. 14 is a schematic cross-sectional view taken along a line E-E' in FIG. 13.

The liquid crystal display device of the embodiment 2 is provided with, for example, as shown in FIG. 13 to FIG. 14, a liquid crystal display panel. The liquid crystal display panel includes a TFT substrate 1, a counter substrate 2, a liquid crystal material 3 which is sandwiched between the TFT substrate 1 and the counter substrate 2, a lower polarizer 4 and an upper polarizer 5 which are arranged in a state that the lower polarizer 4 and the upper polarizer 5 sandwich the TFT substrate 1 and the counter substrate 2 which, in turn, sandwich the liquid crystal material 3, and a resin film 6 which is brought into close contact with the upper polarizer 5 by adhesion. Here, the resin film 6 is, for example, adhered to the polarizer 5 using a tacky adhesive material 7 or an adhesive material. Also in the liquid crystal display device of the embodiment 2, it is favorable to use a film having high optical transmissivity, particularly, a color less transparent film as the resin film 6. The resin film 6 may preferably be made of an acrylic resin or an epoxy resin, for example.

Further, the TFT substrate 1 and the counter substrate 2 are adhered to each other using an annular sealing material 8, and the liquid crystal material 3 is sealed in a sandwiched manner in a space defined by the TFT substrate 1, the counter substrate 2, and the sealing material 8.

Further, the TFT substrate 1 includes a glass substrate 101 and a thin film stacked portion 102, while the counter substrate 2 includes a glass substrate 201 and a thin film stacked portion 202.

Further, the liquid crystal display panel is, for example, housed in a resin-made support member 9 which is formed in a box shape. Here, the liquid crystal display panel is housed in the support member 9 in a state that the resin film 6, the polarizer 5, the counter substrate 2, the liquid crystal material 3, the TFT substrate 1, the polarizer 4 are arranged in this order in the viewing direction as viewed from a viewer. Then, as viewed from the viewer, a bottom surface of the support member 9 is arranged behind the polarizer 4.

Further, in the transmissive liquid crystal display device, a backlight is arranged between the lower polarizer 4 of the liquid crystal display panel and a bottom surface of the support member 9, while a light guide plate 11A which guides light emitted from a light source (not shown in the drawing) to a display surface of the liquid crystal display panel and an optical sheet 11B such as a diffuser are arranged between the lower polarizer 4 and the bottom surface of the support member 9. Here, the light source is, for example, arranged outside an end surface of an outer periphery of the light guide plate 11A not shown in the drawing.

Further, also in the liquid crystal display device of the embodiment 2, an outer periphery of the upper polarizer 5 is arranged more inside than an outer periphery of the counter substrate 2 (the glass substrate 201) and, at the same time, an outer periphery of the resin film 6 is arranged more outside than the outer periphery of the upper polarizer 5. However, different from the liquid crystal display device of the embodiment 1, in regions of outer peripheral portions of the resin film 6 and the counter substrate 2 where the upper polarizer 5 is not interposed, a portion of a frame member 19 which is arranged outside the support member 9 is interposed. Further, a first cushion material 10A is interposed between the frame member 19 and the counter substrate 2, while a second cushion material 10B is interposed between the frame member 19 and the resin film 6.

Here, the frame member 19 is, for example, a box-shape member having a bottom surface which covers an open end of the support member 9, and the bottom surface of the frame member 19 has an opening portion 19A which is opened so that a display region DA of the liquid crystal display panel can be viewed. Further, an end portion in the vicinity of the outer periphery of the opening portion 19A is interposed between the counter substrate 2 and the resin film 6.

Here, the first cushion material 10A and the second cushion material 10B may preferably be formed into an annular shape to surround a periphery of the upper polarizer 5, for example. Then, the first cushion material 10A may preferably be brought into close contact with the counter substrate 2 and the frame member 19, while the second cushion material 10B may preferably be brought into close contact with the resin film 6 and the frame member 19.

To briefly explain the assembling steps of the liquid crystal display device of the embodiment 2, first of all, in the same manner as the liquid crystal display device of the embodiment 1, the liquid crystal display panel in a state that the resin film 6 is not adhered to the liquid crystal display panel, the backlight, the flexible printed circuit board and the like are housed in the support member 9. Here, on a surface of the upper polarizer 5 to which the resin film 6 is adhered, for example, the tacky adhesive material 7 and the cover film are formed. Next, for example, the first cushion material 10A which is formed in an annular shape to surround the upper polarizer 5 is arranged on an outer peripheral portion of the counter substrate 2 and, thereafter, the first cushion material 10A is covered with the frame member 19 having an opening portion 19A formed in a bottom surface thereof. Then, for example, the second cushion material 10B which is formed in an annular shape to surround the upper polarizer 5 is arranged on a periphery of the opening portion 19A of the frame member 19, and a cover film on the tacky adhesive material 7 is peeled off and the resin film 6 is adhered to the upper polarizer 5 using the tacky adhesive material 7. By assembling the liquid crystal display device in accordance with such steps, it is possible to obtain a liquid crystal display device shown in FIG. 13 and FIG. 14.

Also in the liquid crystal display device of the embodiment 2, in the same manner as the liquid crystal display device of the embodiment 1, the resin film 6 is bought into close contact with the upper polarizer 5 by adhesion using the tacky adhesive material 7 and hence, it is possible to increase the strength of the liquid crystal display panel. Accordingly, even when a thickness of the glass substrate 101 of the TFT substrate 1 or a thickness of the glass substrate 201 of the counter substrate 2 is reduced by grinding, for example, the liquid crystal display panel can ensure the sufficient strength. As a result, the thickness of the liquid crystal display device can be reduced compared to the conventional liquid crystal display device. That is, also in the liquid crystal display device of the embodiment 2, both the reduction of a thickness of the liquid crystal display device and the acquisition of the sufficient strength of the liquid crystal display device can be realized simultaneously.

Also in the liquid crystal display device of the embodiment 2, the TFT substrate 1 and the counter substrate 2 are formed using the glass substrate and hence, there exists substantially no difference in deformation quantity attributed to a change of an environment between the TFT substrate 1 and the counter substrate 2. Accordingly, the generation of display irregularities attributed to the change of the environment can be also prevented.

Further, with the use of the liquid crystal display device (module) having the liquid crystal display panel of the embodiment 2 in the portable electronic equipment such as the mobile phone terminal, it is possible to reduce the thickness of the display part of the portable electronic equipment.

Further, when the surface pencil hardness of the surface of the resin film 6, that is, the surface of the resin film 6 which faces the viewer in an opposed manner is 3H or more, flaws are hardly formed on the surface of the resin film 6 and hence, it is possible to impart a function of the protective cover 17 which is mounted to cover an opening portion of the exterior in the conventional mobile phone terminal or the like to the resin film 6. Accordingly, in housing the liquid crystal display device of the embodiment 2 in the exterior 16 of the mobile phone terminal as shown in FIG. 6 and FIG. 7, for example, even when the protective cover 17 is not adhered, it is possible to prevent the formation of flaws on the surface (upper polarizer 5) of the liquid crystal display panel and to prevent the cracking of the liquid crystal display panel due to the application of the pressure to the liquid crystal display panel.

Further, in the liquid crystal display device of the embodiment 2, outside the outer periphery of the upper polarizer 5, for example, the first cushion material 10A which is brought into close contact with the counter substrate 2 and the frame member 19 respectively and the second cushion material 10B which is brought into close contact with the resin film 6 and the frame member 19 respectively are arranged. Accordingly, even when moisture or the like enters the inside of the exterior 16, the first cushion material 10A and the second cushion material 10B constitute walls thus preventing the entered moisture from teaching an end surface of the outer periphery of the upper polarizer 5. As the result, the end surface of the outer periphery of the upper polarizer 5 is hardly corroded or deteriorated thus lowering a possibility that the upper polarizer 5 is peeled off from the counter substrate 2 (glass substrate 201) or the upper polarizer 5 causes display irregularities.

Further, although the detailed explanation is omitted, also in the liquid crystal display device of the embodiment 2, for example, a transparent conductive film 203 may be formed on a surface of the counter substrate 2 (glass substrate 201) to which the upper polarizer 5 is adhered. In this case, by using a conductive resin, conductive rubber or the like, for example, as a material of the first cushion material 10A, the conductive film 203 and the frame member 19 are electrically connected with each other via the first cushion material 10A. Accordingly, for example, it is possible to obtain an advantageous effect that the charging of the upper polarizer 5 and the resin film 6 can be prevented.

Further, also in the liquid crystal display device of the embodiment 2, for example, the lower retardation plate 20 may be arranged between the TFT substrate 1 and the lower polarizer 4, while the upper retardation plate 21 may be arranged between the counter substrate 2 and the upper polarizer 5.

Further, also in the liquid crystal display device of the embodiment 2, the liquid crystal display panel is not limited to the transmissive liquid crystal display panel and may be a reflective liquid crystal display panel or a semi-transmissive liquid crystal display panel.

Figure 15:
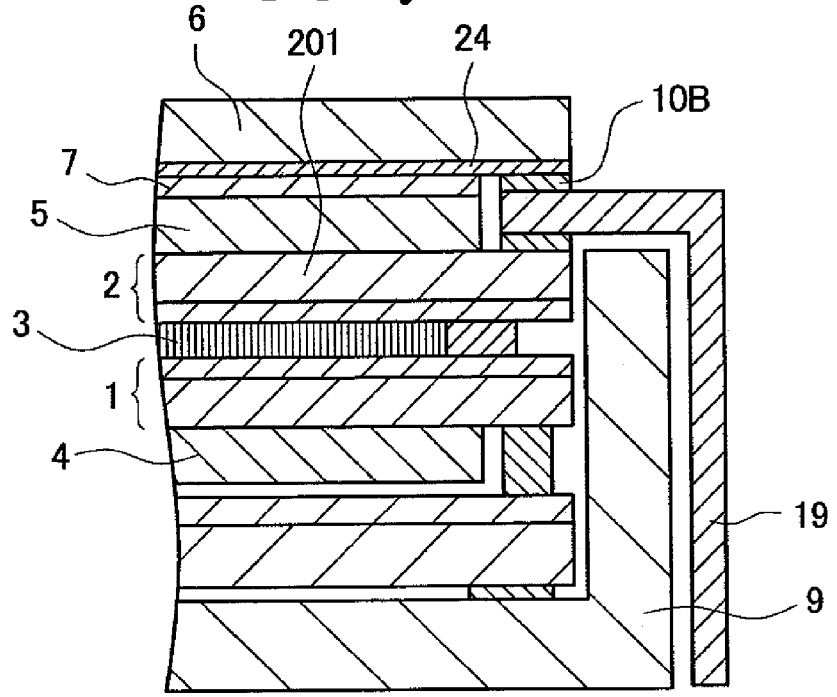
FIG. 15 is a schematic cross-sectional view for explaining a modification of the liquid crystal display device of the embodiment 2.

FIG. 15 is a schematic cross-sectional view for explaining a modification of the liquid crystal display device of the embodiment 2. Here, a cross section shown in FIG. 15 is equal to the cross section shown in FIG. 14. That is, FIG. 15 shows the cross-sectional constitution corresponding to the cross-sectional constitution taken along the line E-E' in FIG. 13.

In the liquid crystal display device of the embodiment 2, the resin film 6 is connected to the metal-made frame member 19 by way of the second cushion material 10B. Accordingly, for example, as shown in FIG. 15, for example, a transparent conductive film 24 made of ITO or the like may be formed on a surface of the resin film 6 which faces the upper polarizer 5 in an opposed manner. Here, the conductive film 24 is provided in a state that the conductive film 24 is interposed between the resin film 6 and the second cushion material 10B. Further, by using the conductive resin, the conductive rubber or the like as the material of the second cushion material 10B, for example, the conductive film 24 and the frame member 19 are electrically connected with each other by way of the second cushion material 10B. Accordingly, for example, even when a conductive film 203 is not formed on a back surface of the glass substrate 201 of the counter substrate 2, it is possible to obtain an advantageous effect to prevent the charging of the upper polarizer 5 and the resin film 6.

Figure 16:
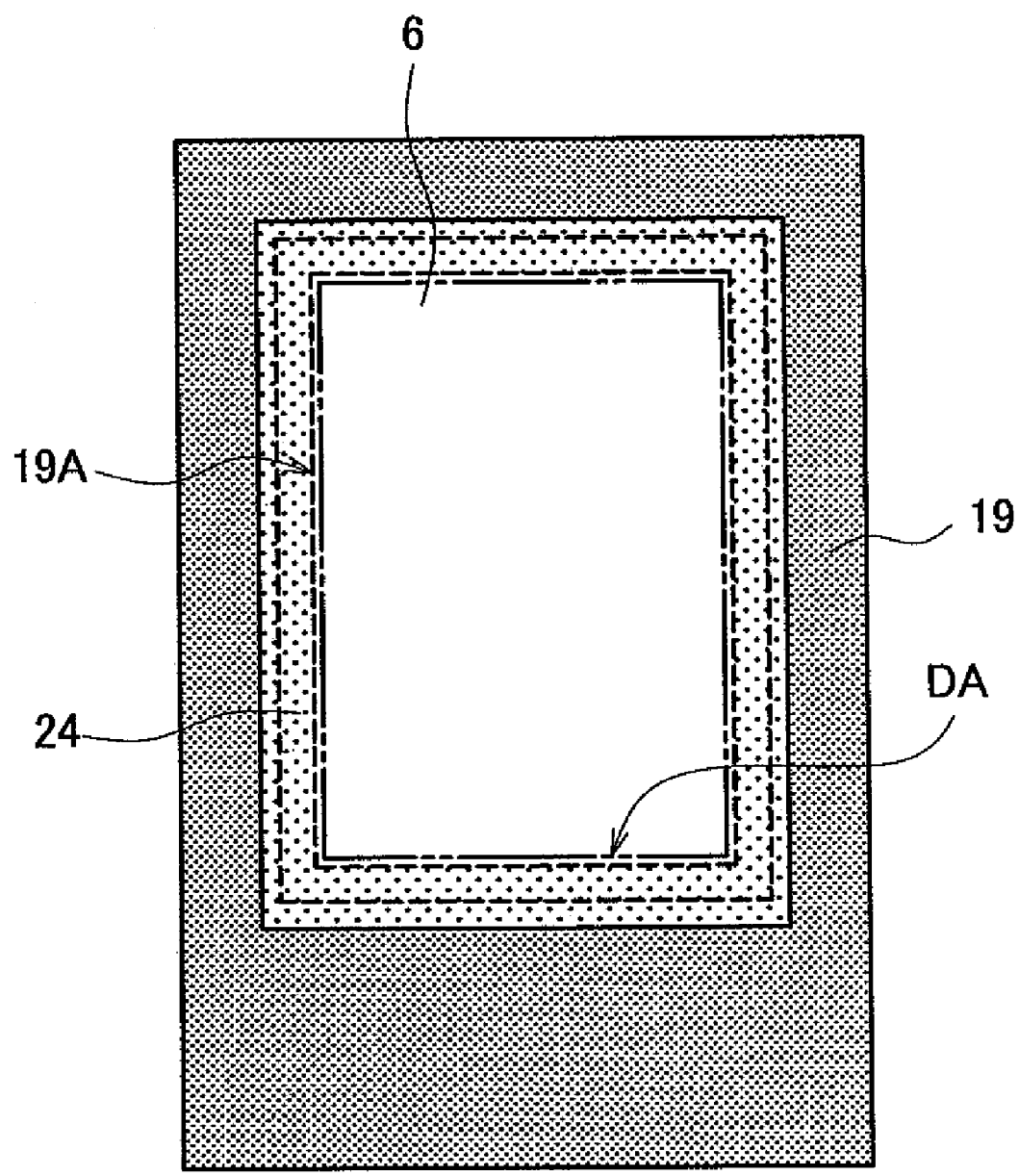
FIG. 16 is a schematic plan view showing one example of a pattern of a conductive film which is formed on a resin film.

FIG. 16 is a schematic plan view showing one example of a pattern of the conductive film formed on the resin film.

In forming the conductive film 24 on the resin film 6, the conductive film 24 may be formed on a whole area of a surface of the resin film 6 which faces the upper polarizer 5 in an opposed manner. However, when the conductive film 24 is formed on the whole area of the surface of the resin film 6 which faces the upper polarizer 5 in an opposed manner, the conductive film 24 is formed also on the display region DA of the display panel and hence, there exists a possibility that a display efficiency is lowered or the display irregularities are generated. Accordingly, the conductive film 24, for example, as shown in FIG. 16, may be formed annularly only outside the display region DA on the surface of the resin film 6 which faces the upper polarizer 5 in an opposed manner. Further, in forming the conductive film 24 only outside the display region DA, for example, out of two pairs of the conductive film which face in the vertical direction as well as in the lateral direction, one pair of conductive films may be formed of a strip-like or linear conductive film.

Here, also in the embodiment 2, as one example of the display device to which the present invention is preferably applied, the liquid crystal display device is named. However, it is needless to say that the embodiment 2 is not limited to the liquid crystal display device and is also applicable to, for example, a self-luminous display device which uses organic EL elements. Further, it is needless to say that the constitution of the display device explained in conjunction with the embodiment 2 is not limited to the liquid crystal display panel and the display panel which uses the organic EL elements and is applicable to various display devices provided with a display panel having the constitution similar to the above-mentioned constitution.

Embodiment 3

Figure 17:
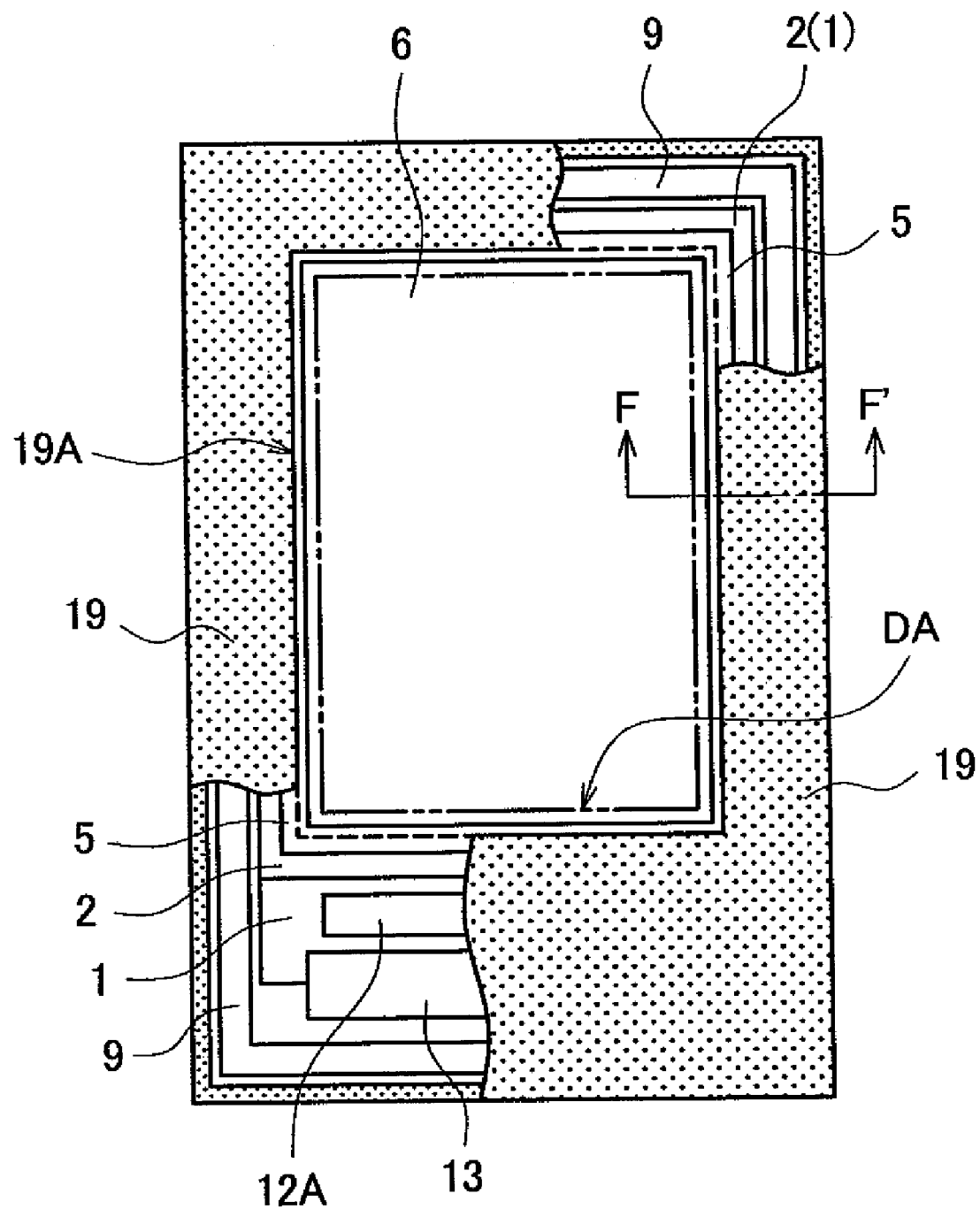
FIG. 17 is a schematic plan view showing the schematic constitution of a liquid crystal display device of an embodiment 3 according to the present invention.
Figure 18:
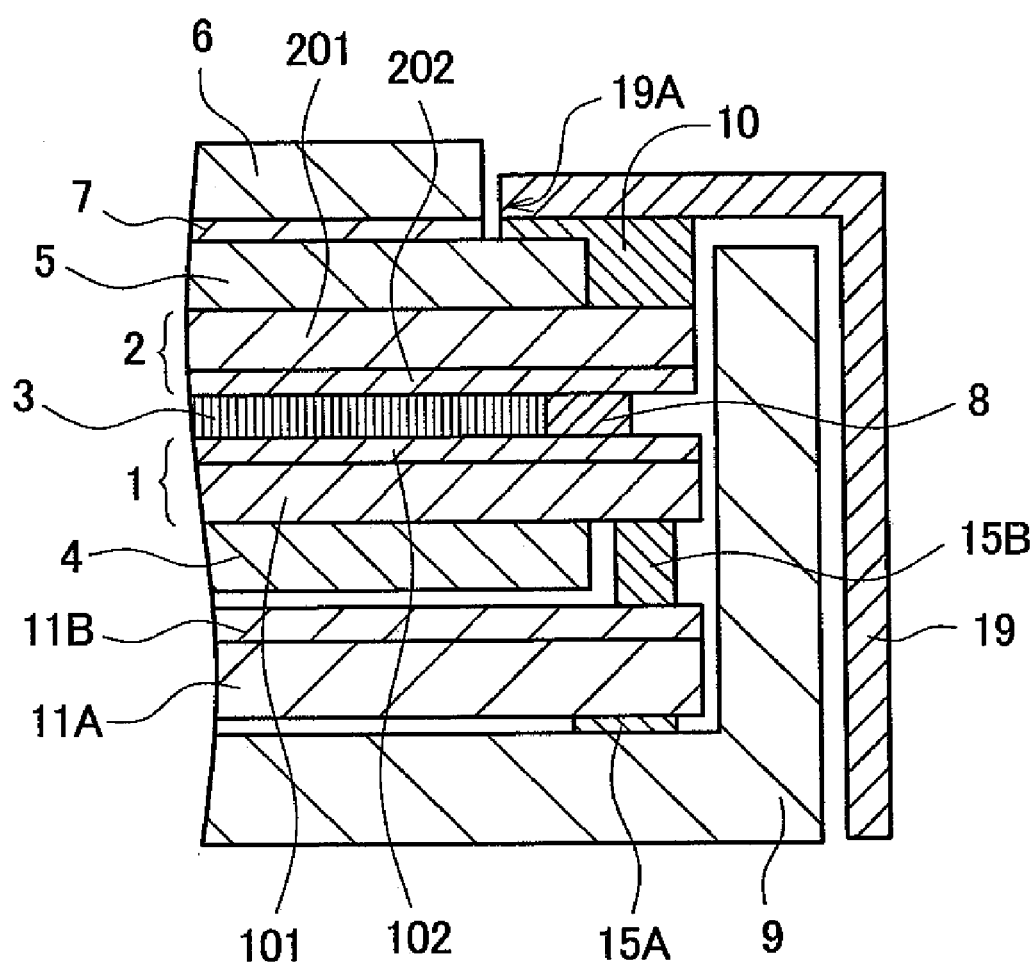
FIG. 18 is a schematic cross-sectional view taken along a line F-F' in FIG. 17.

FIG. 17 is a schematic plan view showing the schematic constitution of a liquid crystal display device of an embodiment 3 according to the present invention. FIG. 18 is a schematic cross-sectional view taken along a line F-F' in FIG. 17.

The liquid crystal display device of the embodiment 3 includes, for example, as shown in FIG. 17 and FIG. 18, a liquid crystal display panel which includes a TFT substrate 1, a counter substrate 2, a liquid crystal material 3 which is sandwiched between the TFT substrate 1 and the counter substrate 2, a lower polarizer 4 and an upper polarizer 5 which are arranged in a state that the lower polarizer 4 and the upper polarizer 5 sandwich the TFT substrate 1 and the counter substrate 2 which sandwich the liquid crystal material 3, and a resin film 6 which is brought into close contact with the upper polarizer 5 by adhesion. Here, the resin film 6 is, for example, adhered to the polarizer 5 using a tacky adhesive material 7 or an adhesive material. Also in the liquid crystal display device of the embodiment 3, it is favorable to use a film having high optical transmissivity, particularly, a colorless transparent film as the resin film 6. For example, the resin film 6 may be made of an acrylic resin or an epoxy resin.

Further, the TFT substrate 1 and the counter substrate 2 are adhered using an annular sealing material 8 to each other, and the liquid crystal material 3 is sealed in a sandwiched manner in a space defined by the TFT substrate 1, the counter substrate 2, and the sealing material 8.

Further, the TFT substrate 1 includes a glass substrate 101 and a thin film stacked portion 102, and the counter substrate 2 includes a glass substrate 201 and a thin film stacked portion 202.

Further, the liquid crystal display panel is, for example, housed in a support member 9 which is formed by forming a resin into a box-shape. Here, the liquid crystal display panel is housed in the support member 9 in a state that the resin film 6, the polarizer 5, the counter substrate 2, the liquid crystal material 3, the TFT substrate 1, and the polarizer 4 are arranged in this order as viewed from a viewer. Then, as viewed from the viewer, a bottom surface of the support member 9 is arranged behind the polarizer 4.

Further, in the transmissive liquid crystal display device, a backlight is arranged between the lower polarizer 4 of the liquid crystal display panel and a bottom surface of the support member 9, while a light guide plate 11A which guides light emitted from a light source (not shown in the drawing) to a display surface of the liquid crystal display panel and an optical sheet 11B such as a diffuser are arranged between the lower polarizer 4 and the bottom surface of the support member 9. Here, the light source is, for example, arranged outside an end surface of the outer periphery of the light guide plate 11A not shown in the drawing.

Further, in the liquid crystal display device of the embodiment 3, different from the liquid crystal display devices of the embodiment 1 and the embodiment 2, the outer periphery of the upper polarizer 5 is arranged more inside than the outer periphery of the counter substrate 2 (glass substrate 201) and, at the same time, the outer periphery of the resin film 6 is arranged more inside than the outer periphery of the upper polarizer 5. Further, a bottom surface of the frame member 19 is arranged on a side closer to the viewer than the upper polarizer 5. Further, the outer periphery of the opening portion 19A formed in a bottom surface of the frame member 19 is arranged inside the outer periphery of the upper polarizer 5 and, at the same time, is arranged at an arbitrary position outside the outer periphery of the resin film 6.

Here, in the vicinity of the outer periphery of the opening portion 19A formed in the bottom surface of the frame member 19, the cushion material 10 which extends from the inside to the outside of the outer periphery of the upper polarizer 5 is arranged. A portion of the cushion material 10 is interposed between the frame member 19 and the upper polarizer 5, and a remaining portion of the cushion material 10 is interposed between the frame member 19 and the counter substrate 2. Here, the cushion material 10 may preferably be brought into close contact with the upper polarizer 5, the counter substrate 2 and the frame member 19. Further, the cushion material 10 may preferably be formed in an annular shape to surround the vicinity of the outer periphery of the upper polarizer 5.

To briefly explain the assembling steps of the liquid crystal display device of the embodiment 3, first of all, in the same manner as the liquid crystal display device of the embodiment 1, the liquid crystal display panel in a state that the resin film 6 is not adhered to the liquid crystal display panel, the backlight, the flexible printed circuit board and the like are housed in the support member 9. Here, on a surface of the upper polarizer 5 to which the resin film 6 is adhered, for example, the tacky adhesive material 7 and the cover film are formed. Next, for example, the cushion material 10 which is formed in an annular shape to surround an end surface of the outer periphery of the upper polarizer 5 is arranged on the vicinity of the outer periphery of the upper polarizer 5 and, thereafter, the cushion material 10 is covered with the frame member 19 having an opening portion 19A formed in a bottom surface thereof. Then, a cover film on the tacky adhesive material 7 is peeled off and the resin film 6 is adhered to the upper polarizer 5 using the tacky adhesive material 7. By assembling the liquid crystal display device in accordance with such steps, it is possible to obtain a liquid crystal display device shown in FIG. 17 and FIG. 18.

Also in the liquid crystal display device of the embodiment 3, in the same manner as the liquid crystal display device of the embodiment 1, the resin film 6 is bought into close contact with the upper polarizer 5 by adhesion using the tacky adhesive material 7 and hence, it is possible to increase the strength of the liquid crystal display panel. Accordingly, even when a thickness of the glass substrate 101 of the TFT substrate 1 or a thickness of the glass substrate 201 of the counter substrate 2 is reduced by grinding, the liquid crystal display panel can ensure the sufficient strength. As a result, the thickness of the liquid crystal display device can be reduced compared to the conventional liquid crystal display device. That is, also in the liquid crystal display device of the embodiment 3, both the reduction of a thickness of the liquid crystal display device and the acquisition of the sufficient strength of the liquid crystal display device can be realized simultaneously.

Also in the liquid crystal display device of the embodiment 3, the TFT substrate 1 and the counter substrate 2 are formed using the glass substrate and hence, there exists substantially no difference in deformation quantity attributed to a change of an environment between the TFT substrate 1 and the counter substrate 2. Accordingly, the generation of display irregularities attributed to the change of the environment can be also prevented.

Further, in the liquid crystal display device of the embodiment 3, an end surface of the outer periphery of the upper polarizer 5 is covered with bottom surfaces of the cushion material 10 and the frame member 19. Accordingly, for example, when the liquid crystal display device is viewed in the oblique direction, the end surface of the outer periphery of the upper polarizer 5 is not viewed and hence, it is possible to prevent the generation of the display irregularities attributed to light leaked from the end surface of the outer periphery of the upper polarizer 5, for example.

Further, with the use of the liquid crystal display device (liquid crystal display module) of the embodiment 3 in the portable electronic equipment such as the mobile phone terminal, it is possible to reduce the thickness of the display part of the portable electronic equipment.

Further, when the surface pencil hardness of the surface of the resin film 6, that is, the surface of the resin film 6 which faces the viewer is 3H or more, flaws are hardly formed on the surface of the resin film 6 and hence, it is possible to impart a function of the protective cover 17 which is mounted to cover an opening portion of the exterior in the conventional mobile phone terminal or the like to the resin film 6. Accordingly, in housing the liquid crystal display device of the embodiment 3 in the exterior 16 of the mobile phone terminal as shown in FIG. 6 and FIG. 7, for example, even when the protective cover 17 is not adhered, it is possible to prevent the formation of flaws on the surface (upper polarizer 5) of the liquid crystal display panel and to prevent the cracking of the liquid crystal display panel due to the application of the pressure to the liquid crystal display panel.

Further, in the liquid crystal display device of the embodiment 3, the cushion material 10 is brought into close contact with an end surface of the outer periphery of the upper polarizers. Accordingly, even when moisture or the like enters the inside of the exterior 16, the cushion material 10 constitutes a wall thus preventing the entered moisture from reaching the end surface of the outer periphery of the upper polarizer 5. As the result, the end surface of the outer periphery of the upper polarizer 5 is hardly corroded or deteriorated thus lowering a possibility that the upper polarizer 5 is peeled of f from the counter substrate 2 (glass substrate 201) or the upper polarizer 5 causes display irregularities.

Further, although the detailed explanation is omitted, also in the liquid crystal display device of the embodiment 3, for example, a transparent conductive film 203 may be formed on a surface of the counter substrate 2 (glass substrate 201) to which the upper polarizer 5 is adhered. In this case, by using a conductive resin or conductive rubber, for example, as a material of the cushion material 10, the conductive film 203 and the frame member 19 are electrically connected with each other via the cushion material 10. Accordingly, for example, it is possible to obtain an advantageous effect that the charging of the upper polarizer 5 and the resin film 6 can be prevented.

Further, also in the liquid crystal display device of the embodiment 3, for example, the lower retardation plate 20 may be arranged between the TFT substrate 1 and the lower polarizer 4, while the upper retardation plate 21 may be arranged between the counter substrate 2 and the upper polarizer 5.

Further, also in the liquid crystal display device of the embodiment 3, the liquid crystal display panel is not limited to the transmissive liquid crystal display panel and may be a reflective liquid crystal display panel or a semi-transmissive liquid crystal display panel.

Here, also in the embodiment 3, as one example of the display device to which the present invention is preferably applied, the liquid crystal display device is named. However, it is needless to say that the embodiment 3 is not limited to the liquid crystal display device and is also applicable to a self-luminous display device which uses organic EL elements, for example. Further, it is needless to say that the constitution of the display device explained in conjunction with the embodiment 3 is not limited to the liquid crystal display panel and the display panel which uses the organic EL elements and is applicable to various display devices provided with a display panel having the constitution similar to the above-mentioned constitution.

The present invention has been explained specifically in conjunction with the above-mentioned embodiments heretofore. However, it is needless to say that the present invention is not limited to the above-mentioned embodiments and various modifications are conceivable without departing from the gist of the present invention.

For example, the support member 9 of the liquid crystal display device which is used in the embodiment 1 to the embodiment 3 has, as shown in FIG. 2 and FIG. 3, a bottom surface behind the lower polarizer 4 as viewed from a viewer. However, the support member 9 may be a frame-like member which does not have such a bottom surface. When the support member 9 is formed in a frame shape, a reflection sheet is arranged on a portion of the support member 9 corresponding to the bottom surface, that is, on an open end behind the lower polarizer 4 as viewed from the viewer. Here, the reflection sheet is arranged, for example, between the light guide plate 11A and the flexible printed circuit board 13. Further, for example, also when the support member 9 having the bottom surface shown in FIG. 2 and FIG. 3 is used, a reflection sheet may be arranged between the inner bottom surface and the light guide plate 11A.

Further, in the liquid crystal display device used in the embodiment 1 to the embodiment 3, the resin film 6 of the liquid crystal display panel is arranged closest to the viewer as viewed from the viewer and is exposed. However, the present invention is not limited to such a constitution and, for example, a reflection prevention layer (AG layer; Anti-glare layer) may be formed on a viewer's side surface of the resin film 6.

What is claimed is:

1. A display device comprising:
   a display panel which includes a first substrate, a second substrate which is arranged to face the first substrate in an opposed manner on a side closer to a viewer than the first substrate, an upper polarizer which is arranged on the side closer to the viewer than the second substrate, and a resin film which is arranged on the side closer to the viewer than the upper polarizer and is brought into close contact with the upper polarizer by adhesion,
   a box-like or a frame-like support member which houses the display panel, and
   a frame member which is arranged outside the support member, wherein
   an outer periphery of the upper polarizer is arranged more inside than an outer periphery of the second substrate and an outer periphery of the resin film is arranged more outside than the outer periphery of the upper polarizer as viewed from a front surface of the display panel,
   the frame member is arranged between the second substrate and the resin film as viewed from the viewer and includes a portion which is overlapped to the second substrate and the resin film as viewed from a front surface of the display panel,
   a first cushion material which is respectively brought into close contact with the second substrate and the frame member is interposed between the second substrate and the portion of the frame member which is overlapped to the second substrate, and
   a second cushion material which is respectively brought into close contact with the resin film and the frame member is interposed between the resin film and the portion of the frame member which is overlapped to the resin film.

2. A display device according to claim 1, wherein the first cushion material and the second cushion material are formed in an annular shape to surround the outer periphery of the upper polarizer.

3. A display device according to claim 1, wherein the resin film has a thickness of 0.2 mm or more and 2 mm or less.

4. A display device according to claim 1, wherein a material of the resin film is an acrylic resin or an epoxy resin.

5. A display device according to claim 1, wherein a surface hardness of the resin film is a surface pencil hardness of 3H or more.

6. A display device according to claim 1, wherein a total thickness of the display panel excluding the resin film is 1.4 mm or less.

7. A display device according to claim 1, wherein the display panel includes a conductive layer between the upper polarizer and the resin film.

8. A display device according to claim 1, wherein the display panel includes an upper retardation plate between the upper polarizer and the second substrate.

9. A display device according to claim 1, wherein the display panel includes a lower polarizer which is arranged behind the first substrate as viewed from the viewer.

10. A display device according to claim 9, wherein the display panel includes a lower retardation plate between the lower polarizer and the first substrate.

11. A display device according to claim 1, wherein the first substrate and the second substrate are glass substrates.

12. A display device according to claim 1, wherein the display panel includes a liquid crystal layer between the first substrate and the second substrate.

* * * * *